(12) United States Patent
Ekhaus

(10) Patent No.: US 7,177,864 B2
(45) Date of Patent: Feb. 13, 2007

(54) METHOD AND SYSTEM FOR DATA PROCESSING FOR PATTERN DETECTION

(75) Inventor: Michael A. Ekhaus, Hopkins, MN (US)

(73) Assignee: Gibraltar Analytics, Inc., Hopkins, MN (US)

( * ) Notice: Subject to any disclaimer, the term of this patent is extended or adjusted under 35 U.S.C. 154(b) by 412 days.

(21) Appl. No.: 10/426,092

(22) Filed: Apr. 29, 2003

(65) Prior Publication Data

US 2003/0212658 A1    Nov. 13, 2003

Related U.S. Application Data

(60) Provisional application No. 60/378,628, filed on May 9, 2002.

(51) Int. Cl.
*G06F 17/30* (2006.01)

(52) U.S. Cl. ......................................... 707/6; 707/200

(58) Field of Classification Search .............. 707/1–10, 707/101–104, 200, 6; 380/250–300
See application file for complete search history.

(56) References Cited

U.S. PATENT DOCUMENTS

| | | | | |
|---|---|---|---|---|
| 4,573,034 A * | 2/1986 | Schouhamer Immink | .... | 341/95 |
| 6,182,061 B1 * | 1/2001 | Matsuzawa et al. | ........... | 707/2 |
| 6,324,533 B1 * | 11/2001 | Agrawal et al. | ............... | 707/3 |
| 6,385,608 B1 * | 5/2002 | Mitsuishi et al. | .............. | 707/6 |
| 6,389,416 B1 | 5/2002 | Agarwal et al. | | |
| 2003/0078686 A1 * | 4/2003 | Ma et al. | ....................... | 700/91 |
| 2003/0086564 A1 * | 5/2003 | Kuhlman | ...................... | 380/37 |
| 2003/0110186 A1 * | 6/2003 | Markowski et al. | ..... | 707/104.1 |
| 2003/0142644 A1 * | 7/2003 | Rose | .......................... | 370/328 |
| 2003/0185307 A9 * | 10/2003 | Akiyoshi et al. | ...... | 375/240.27 |
| 2003/0200191 A1 * | 10/2003 | Pao et al. | ..................... | 706/47 |
| 2003/0204499 A1 * | 10/2003 | Shahabi et al. | ................ | 707/3 |
| 2003/0208488 A1 * | 11/2003 | Perrizo | .......................... | 707/6 |
| 2003/0220771 A1 * | 11/2003 | Vaidyanathan et al. | ........ | 703/2 |

OTHER PUBLICATIONS

RIchard S. Vagra and Michael A. Harison, "Computer Science and Information Processing", Addison-Wesley, 1973, p. 51-56.*

(Continued)

*Primary Examiner*—Hosain Alam
*Assistant Examiner*—Shew-Fen Lin
(74) *Attorney, Agent, or Firm*—Dorsey & Whitney LLP

(57) ABSTRACT

A computerized method for analyzing data files finds association relationships between attributes recorded in the data files. The computer receives one or more data file records, each record containing two or more of attributes of interest. Software defines at least two attribute k-patterns by reference to a subset of the attributes, where k is an integer and represents the number of attributes that are included in a k-pattern. Using an invertible mapping algorithm, the software maps each of the at least two attribute k-patterns into an associated key and determines a distribution pattern for each of the at least two attribute k-patterns defined in step. The software then inverts the mapping to decode from the keys to the associated attribute k-pattern; and, using the keys, associates the distribution patterns determined with each of the at least two attribute k-patterns. Output is in the form of reports, detection signals and/or control signals.

35 Claims, 6 Drawing Sheets

OTHER PUBLICATIONS

Alvares, G., et al., *Tolerating Multiple Failures in RAID Architectures with Optimal Storage and Uniform Declustering*, In Proc. of the 24th Annual ACM/IEEE International Symposium on Computer Architecture (ISCA'97), Denver Colorado, Jun. 1997, (11pgs).

Kunth, Donald E., *Art of Computer Programming*, vol. 3, Sorting and Searching, Second Edition, Addison Wesley, (1998), (cover page, table of contents, pp. 572-573).

Graham, Ronald L., et al., *Concrete Mathematics: A Foundation for Computer Science*, Second Edition, Addison Wesley, (1994), (cover page, table of contents, p. 234).

* cited by examiner

| K-pattern parameters | Key | Cardinality | Other k-pattern information |
|---|---|---|---|
| K=0 | 0 | | |
| K=1 | 1 | | |
| | 2 | | |
| | 3 | | |
| | 4 | | |
| | 5 | | |
| K=2 | 6 | | |
| | 7 | | |
| | . | | |
| | . | | |
| | . | | |
| | 15 | | |
| K=3 | 16 | | |
| | 17 | | |
| | . | | |
| | . | | |
| | . | | |
| | 25 | | |
| K=4 | 26 | | |
| | 27 | | |
| | 28 | | |
| | 29 | | |
| | 30 | | |
| k=5 | 31 | | |

FIGURE 4

| K-pattern parameters | Key | Cardinality | Other k-pattern information |
|---|---|---|---|
| N=4, K=2 | 0 | | |
| | 1 | | |
| | 2 | | |
| | 3 | | |
| | 4 | | |
| | 5 | | |
| | 6 | | |
| | 7 | | |
| | 8 | | |
| | 9 | | |

| K-pattern parameters | Key | Cardinality | Other k-pattern information |
|---|---|---|---|
| N=4, K=3 | 0 | | |
| | 1 | | |
| | 2 | | |
| | 3 | | |
| | 4 | | |
| | 5 | | |
| | . | | |
| | . | | |
| | . | | |
| | 18 | | |
| | 19 | | |

FIGURE 5

| K-pattern parameters | Key | Cardinality | Other k-pattern information, including meta information | trigger information and response-type information |
|---|---|---|---|---|
| K=0 | 0 | | | |
| K=1 | 1 | | | |
| | 2 | | | |
| | . | | | |
| | 1000 | | | |
| K=2 | 1001 | | | |
| | 1002 | | | |
| | . | | | |
| | . | | | |
| | 500500 | | | |
| K=3 | 500501 | | | |
| | 500502 | | | |
| | . | | | |
| | 25742876 | 50 | {(851, .96),(905, .90), ...} | |
| | . | | | |
| | 166166999 | | | |
| | 166667500 | | | |
| K=4 | 166667501 | | | |
| | . | | | |
| | 21865720801 | 48 | | |
| | . | | | |
| | 27931819531 | 45 | | T; R |
| | . | | | |

FIGURE 6

METHOD AND SYSTEM FOR DATA PROCESSING FOR PATTERN DETECTION

CROSS REFERENCE TO RELATED APPLICATION(S)

This application claims priority from U.S. Provisional Application No. 60/378,628 filed on May 9, 2002, the contents of which are hereby incorporated by reference in its entirety.

1 FIELD OF INVENTION

This invention relates to the field of analyzing patterns within computerized data formats such as files, databases, and data streams. More particularly, the invention is concerned with a process and method for determining the number of occurrences of patterns within such data files, together with important statistical information about the patterns. The approach further concerns parallelizable algorithms for software suitable for analyzing such data and for facilitating computer resource management for such analysis.

2 BACKGROUND OF THE DISCLOSURE

The advent of the modern electronic computer has exacerbated several issues of dealing with information analysis. Although not a complete list of issues, among these issues are:
  a. The increased demand for the collection and storage of data.
  b. The increased complexity for retrieval of data from storage.
  c. The increased complexity in understanding of relationships within data.

These areas are becoming even more complex due to an increased rate at which data is being generated and collected in computer databases, or embodied in data streams. This invention deals with facilitating computations for finding and understanding the information content of such data. In particular, this invention is concerned with understanding the patterns that occur within data and their frequency.

Areas in which such data analysis issues arise include:
1. Search Engines,
2. Data Mining,
3. Market Research,
4. Census/Demographic Analysis,
5. Fraud/Security Analysis,
6. Analysis of financial markets,
7. Bioinformatics data analysis Although this list is not complete, it suffices to introduce the type of subject areas in which frequency of patterns in computerized data play an important role.

A basic concept in dealing with data is that of a record, comprising a collection of attributes or attribute entries chosen from a set of possibilities. For example, a person may have a medical record containing information about that person's medical history. The collection of attributes from which a record is formed can be large. Furthermore, the number of such records that may be under consideration may also be large. To summarize, there are many records whose entries are from among many possibilities. This is a key reason why computers have exacerbated issues of dealing with data. It is a cycle: the better computers deal with data, the more data they are required to deal with. This cycle has continued in an ever-increasing manner, and has been brought to an unprecedented level recently. There is little chance that this trend will slow down.

Consider a record consisting of information about demographics, a person's medical history, etc. By enumerating the attributes (e.g., by encoding them as integers), one may consider a record to be collection of numbers representing the attribute entries. For example, RECORD_1 may be represented as {1, 30, 43, 89, 20345} and RECORD_2 as {1, 3, 43, 89, 2235}. It is observable that the "patterns"

$$\{\{1\}, \{43\}, \{89\}, \{1,43\}, \{1,89\}, \{43,89\}, \{1,43,89\}\}$$

occurred twice and all other patterns occurred once. As the number of records and attributes increase, the complexity of computing the number of occurrences of patterns consisting of one, two, three or more attributes requires additional methods beyond a casual inspection. Notice each of these patterns is also a set of attributes. Some patterns involve one attribute. While others involve pairs, triples, etc., of attributes. The occurrence of single attribute patterns is easily calculated, and it should be noted that the occurrence of pairs of attributes is also fairly easily calculated. Triple attribute patterns, and higher order patterns (including four, five, etc. attributes) have increased complexity, and require more powerful approaches, in order to be handled with available computing resources.

Furthermore, a record may be more complicated than as expressed above. The attributes may in fact have additional auxiliary attributes. For instance, a date or time-stamp may be included and associated with one or more attributes. We may be interested in patterns that meet some constraint about the auxiliary attributes. For example, one may only be interested in patterns with attributes that have occurred within 30 days of each other. Otherwise, the pattern may have no use to the analysis. In such cases, the full data record collection may be segmented or filtered before analysis to include only records meeting certain criteria. What constitutes an attribute or an auxiliary attribute depends in part on the data and the specifics of what one cares to learn about that data. There are numerous ways in which data is handled and represented, and as such the distinction between an attribute and an auxiliary attribute is dependent on the specific analysis being sought for the record collection.

The present invention involves both data mining and statistical analysis of data. Although not a precise definition of either discipline, the following statements show that there may be a useful distinction.

Statistical Analysis—Ideally, one designs and conducts experiments and then tests the validity of hypotheses from data collected. One gains an understanding of the properties of the data from the underlying distributions. The validity of a hypothesis is established from analyzing the distributions. Typically, the hypothesis defines and limits what patterns are of interest in the data and what computations are done on the data.

Data Mining—In many cases, the data does not represent the outcome of a structured experiment. In such cases, methods that allow for the discovery of patterns anywhere in the data are needed. Methods for determining significant patterns in data are usually referred to as Data Mining. Furthermore, the data from these unstructured experiments tends to be enormous. Data Mining methods typically make or require assumptions in order to control computational complexity.

U.S. Pat. No. 6,389,416 for Depth First Method for Generating Itemsets describes a data mining system and method for generating associations among items in a large database. In particular, it refers to a set {I} comprising all items in a database of transactions. The patent further refers to an association rule between a set of items {X} that is a subset of {I} and another set {Y} that is also a subset of {I}. The association is expressed as {X}→{Y}, which indicates that the presence of items X in the transaction also indicates a strong possibility of the presence of the set of items Y. The patent notes that the measures used to indicate the strength of such an association rule are support and confidence, where the support of the rule {X}→{Y} is the fraction of transactions containing both X and Y. The confidence of the rule {X}→{Y} is the fraction of the transactions containing X that also contain Y. The patent further states:

> In the association rule problem, it is desired to find all rules above a minimum level of support and confidence. The primary concept behind most association rule algorithms is a two phase procedure: In the first phase, all frequent itemsets (or large itemsets) are found. An itemset is "frequent" or large if it satisfies a user-defined minimum support requirement. The second phase uses these frequent itemsets in order to generate all the rules which satisfy the user specified minimum confidence.

Having posited these propositions, the patent goes on to describe a depth first search technique in order to construct a lexicographic tree of itemsets. It claims that this method substantially reduces the CPU time for counting large itemsets. It further describes counting methods for higher level nodes of the lexicographic tree structure and a two phase bucketing procedure for counting support at lower level nodes. The patent asserts that these optimize processing time and database storage utilization.

While the teachings of U.S. Pat. No. 6,389,416 may help with efficient use of computing resources when large and complex databases are being analyzed, they still have (at least) the disadvantage that user defined minimum levels of support and confidence are used to determine what itemsets are to be developed and their occurrence counted. This necessarily results in some data being declared a priori not of interest and therefore discarded or not developed. The following example shows the problems with such an approach.

The example uses two criteria commonly used in analyzing data and discusses how they interplay with one another (1) McNemar's test, and (2) thresholding based on item-set frequency.

We consider McNemar's test because it is common, simple and relevant to our discussion, but it is not meant to be the most general situation. McNemar's test may be used to determine the significance of change when a subject is used that has its own control in a "before" and "after" test with nominal or categorical measurements. In plain English, we take a before and after survey of an event using the same people, and we record and count the positive and negative opinions.

| Before | After | |
|---|---|---|
| | + | − |
| + | A | B |
| − | C | D |

This table is a 2×2 contingency table and the McNemar test uses the values in the table to compute the statistic $$\chi^2 = \frac{(|B - C| - 1)^2}{B + C}.$$

This value is then used to determine a "P-Value" and ultimately to determine the degree to which the change is considered statistically significant.

As noted above, in the data mining of associations, one typically confines the associations analyzed to those having a minimum "support" and minimum "confidence" levels. These thresholds are used as criteria for determining whether an association is "interesting". Criteria such as these, throw away any information that does not happen often enough within the data for which the levels are calculated.

The issue that arises between overly simplified thresholding and criteria like the McNemar test is the following. Suppose we wish to discover interesting associations between attributes of surveyed people and whether their changed responses to a test survey are to be considered statistically significant. If we threshold in a simple data mining manner, then we may not fill out the contingency tables that reflect the most statistically significant changes, and these cases are not considered in our analysis. Throwing away information can lead to missing the most significant changes. In the following, we detail an example to illustrate how this can happen.

We will consider a very simple survey consisting of one question asked before and after a Presidential debate: Which candidate do you prefer, A or B?

Suppose this survey is conducted over a panel of 1,000 people. A standard McNemar test is used to determine whether opinion shifts between surveys are statistically significant. In addition to the survey data, we also have attributional data associated to the people surveyed. For example, we might know the gender, age, parent status, educational level, profession, income, location, etc. Table 1 shows 300 people preferred candidate A both before and after, 188 people preferred candidate B before but candidate A after, etc.

The values in Table 1 have been chosen so that there is no difference and hence no statistically significant difference before and after the debate as measured across the entire sample. We want to discover sets of attributes that individuals share, for which there exist statistically significant differences from before and after the debate. More precisely, we are interested in discovering which attributes result in contingency tables for which the McNemar test shows statistical significance and use the McNemar test as a measure to the degree of asymmetry in the tables. This is both a Data Mining problem and a Statistics problem. We wish to use methodology from both disciplines. We do not want to apriori guess about which attributes to use for the conditioning; we wish to discover them by use of an efficient method. After an association is discovered one can decide whether to conduct a specific study to analyze the association further.

TABLE 1

Candidates Approval Ratings
Entire Survey with no conditioning

|        | After |     |       |
|--------|-------|-----|-------|
| Before | A     | B   | Total |
| A      | 300   | 188 | 488   |
| B      | 188   | 324 | 512   |
| Total  | 488   | 512 | 1000  |

$x^2 = 0.003$ 1 df,
P-Value = 0.9589

Similarly, the values in Table 2-a and Table 2-b show that segmenting on gender does not produce sub-surveys with significant statistical differences from before and after the debate. In fact, there are still no actual differences from before and after the debate. (The values were chosen using 49 and 51 percent of the values of the original table.)

TABLE 2-a

Candidates Approval Ratings
Men Only

|        | After |     |       |
|--------|-------|-----|-------|
| Before | A     | B   | Total |
| A      | 147   | 92  | 239   |
| B      | 92    | 159 | 251   |
| Total  | 239   | 251 | 490   |

$x^2 = 0.005$ 1 df,
P-Value = 0.9412

TABLE 2-b

Candidates Approval Ratings
Women Only

|        | After |     |       |
|--------|-------|-----|-------|
| Before | A     | B   | Total |
| A      | 153   | 96  | 249   |
| B      | 96    | 165 | 261   |
| Total  | 249   | 261 | 510   |

Suppose we further segmented on the Women Only table to be Women-Single-Parent and Women-Not-Single-Parent, the resulting tables might appear as

|        | After |     |       |
|--------|-------|-----|-------|
| Before | A     | B   | Total |
| A      | 153   | 96  | 249   |
| B      | 96    | 165 | 261   |
| Total  | 249   | 261 | 510   |

$x^2 = 0.005$ 1 df,
P-Value = 0.9425

TABLE 2-b1

Candidates Approval Ratings
(Women, Single Parent) Only

|        | After |     |       |
|--------|-------|-----|-------|
| Before | A     | B   | Total |
| A      | 54    | 44  | 98    |
| B      | 24    | 58  | 82    |
| Total  | 78    | 102 | 180   |

$x^2 = 5.309$ 1 df,
P-Value = 0.0212

TABLE 2-b2

Candidates Approval Ratings
(Women, Not Single Parent) Only

|        | After |     |       |
|--------|-------|-----|-------|
| Before | A     | B   | Total |
| A      | 99    | 52  | 151   |
| B      | 72    | 107 | 179   |
| Total  | 171   | 159 | 330   |

$x^2 = 2.911$ 1 df,
P-Value = 0.0880

Using McNemar's test, the Women-Single-Parent table (2-b1) shows statistically significant differences from before and after the debate. In contrast, the Women-Not-Single-Parent table (2-b2) indicates a difference that is not quite statistically significant.

In a analogous manner, the following segmentation of the "Men only" table based on age might appear as:

TABLE 2-a

Candidates Approval Ratings
Men Only

|        | After |     |       |
|--------|-------|-----|-------|
| Before | A     | B   | Total |
| A      | 147   | 92  | 239   |
| B      | 92    | 159 | 251   |
| Total  | 239   | 251 | 490   |

$x^2 = 0.005$ 1 df,
P-Value = 0.9412

TABLE 2-a1

Candidates Approval Ratings
(Men 18–25 years old) Only

|        | After |     |       |
|--------|-------|-----|-------|
| Before | A     | B   | Total |
| A      | 25    | 8   | 33    |
| B      | 23    | 28  | 51    |
| Total  | 48    | 36  | 84    |

$x^2 = 6.323$ 1 df,
P-Value = 0.0119

TABLE 2-a2

Candidates Approval Ratings
(Men 26–35 years old) Only

| Before | After | | |
|---|---|---|---|
| | A | B | Total |
| A | 96 | 70 | 166 |
| B | 50 | 103 | 153 |
| Total | 146 | 173 | 319 |

$x^2 = 3.008$ 1 df,
P-Value = 0.0828

TABLE 2-a3

Candidates Approval Ratings
(Men $\geq$ 36 years old) Only

| Before | After | | |
|---|---|---|---|
| | A | B | Total |
| A | 26 | 14 | 40 |
| B | 19 | 28 | 47 |
| Total | 45 | 42 | 87 |

$x^2 = 0.485$ 1 df,
P-Value = 0.4862 and in this situation, Table 2-a1 is statistically significant, Table 2-a2 is not quite statistically significant, and 2-a3 is not statistically significant.

We summarize the breakdown according to attributes as follows.
1. Entire Panel—Change not significant
   a. Women Only—Change not significant
      i. Women Single Parent—Change significant
      ii. Women Not Single Parent—Change not quite significant
   b. Men Only—Change not significant
      i. Men 18–25 years old—Change significant
      ii. Men 26–35 years old—Change not quite significant
      iii. Men$\geq$36 years old—Change not significant The data mining problem of finding statistically significant sub-surveys can be established by finding attribute sets with associated p-values (the p-value of the contingency table restricted to the individuals corresponding to the attribute set) less than a small threshold value. The p-value represents the probability that we can reject the hypothesis that the change is statistically significant. The smaller the p-value, the more unlikely it is that we can reject the case.

The values chosen were constructed to deliberately show that as the support for the contingency tables increases, the statistical significance of change from before and after the debate may actually decrease. This is not a surprise; we exploited the fact that different factions can "average out" over large enough groups and mask the relevant events.

Traditionally data mining places conditions on whether an "item-set" or data pattern is relevant or of interest. For example, the event (male, 18–25 years old, A before, B after) only occurs 8 times in a thousand. If the item-set support threshold is set to 3% (0.03), Tables 2-a1 and 2-a3 would never be considered. This is fine in the case of Table 2-a3, because the McNemar test would reject the case, but we still lose the case corresponding to Table 2-a1. Given this segmentation, it is only upon lowering the item-set threshold to 0.008 that the case 2-a1 would emerge as the most statistically significant change of opinion. Note that the table support for the demographic set is 8.4% of the sample, which is not trivial.

We conclude that even in cases where the entire survey produces no statistical or actual differences in the change of opinion, the underlining distribution can hide important aspects that cancel each other out and are statistically significant as measured by the McNemar test. Furthermore, simple thresholding used in conventional data mining will not discover these events.

What is needed in the art is a method and system for more efficiently and completely analyzing computerized data records that contain large numbers of attributes to develop information on complex patterns that may exist within the records.

3 SUMMARY OF THE INVENTION

In one embodiment of the invention, a process and method for determining the frequency of patterns in computerized data files and other pertinent information regarding these patterns comprises:
1. Providing input data in the form of records.
2. Filtering the input in accordance with a configuration.
3. Calculating information pertaining to the patterns occurring within the processed records, with possible additional filtering in accordance with the configuration; using an invertible mapping to associate keys with particular patterns.
4. if required:
   a. Externally storing interim information pertaining to the occurring patterns.
   b. Combining of interim information pertaining to the occurring patterns.
   c. Additional filtering of the processed patterns.

Statistically Significant Demographic based sub-surveys, p-value $\leq$ 0.1000

| | Demographic Set | Table Support | $\chi^2$ | P-Value | Qual. Measure |
|---|---|---|---|---|---|
| 1 | Men, 18–25 years old | 0.084 | 6.323 | 0.0119 | significant |
| 2 | Women, Single Parent | 0.180 | 5.309 | 0.0212 | significant |
| 3 | Men, 26–35 years old | 0.319 | 3.008 | 0.0828 | not quite significant |
| 4 | Women, Not Single Parent | 0.330 | 2.911 | 0.0880 | not quite significant |
| | . . . . | . | . | . | . |
| | . . . . | . | . | . | . |
| | . . . . | . | . | . | . |

5. Providing a summary of the totality of the information pertaining to the patterns that are in accordance with criteria stated within the configuration.

In one embodiment the invention comprises a computerized method for analyzing data files to find association relationships between attributes recorded in the data files. The computer receives one or more of data file records and/or data record streams, each record containing one or more attributes of interest and uses an invertible mapping algorithm, for mapping subsets of the attributes in each record into a key. The method includes defining at least two attribute k-patterns by reference to a subset of the attributes, where k is a positive integer greater than 0 and represents the number of mapped attributes that are included in the pattern. The method further involves determining a distribution pattern for at least one k-pattern defined in the preceding step and inverting the mapping to decode from the keys to the corresponding attributes. As output, the method provides a k-pattern distribution report using determined distribution patterns and the attributes.

4 BRIEF DESCRIPTION OF THE DRAWINGS

FIG. 4 shows schematically the virtual space for k-pattern information as mapped to keys under an example of a bijection for a simple set of attributes and k-patterns.

FIG. 5 shows schematically the virtual space for k-pattern information as mapped to keys under an alternate example of a bijection for a simple set of attributes and k-patterns.

FIG. 6 shows schematically a virtual space for k-pattern information generalized as in FIG. 4, with an example of meta-information linking k-patterns and detection trigger information.

5 DESCRIPTION OF PREFERRED EMBODIMENTS 5.1 Overview

Figure 1:
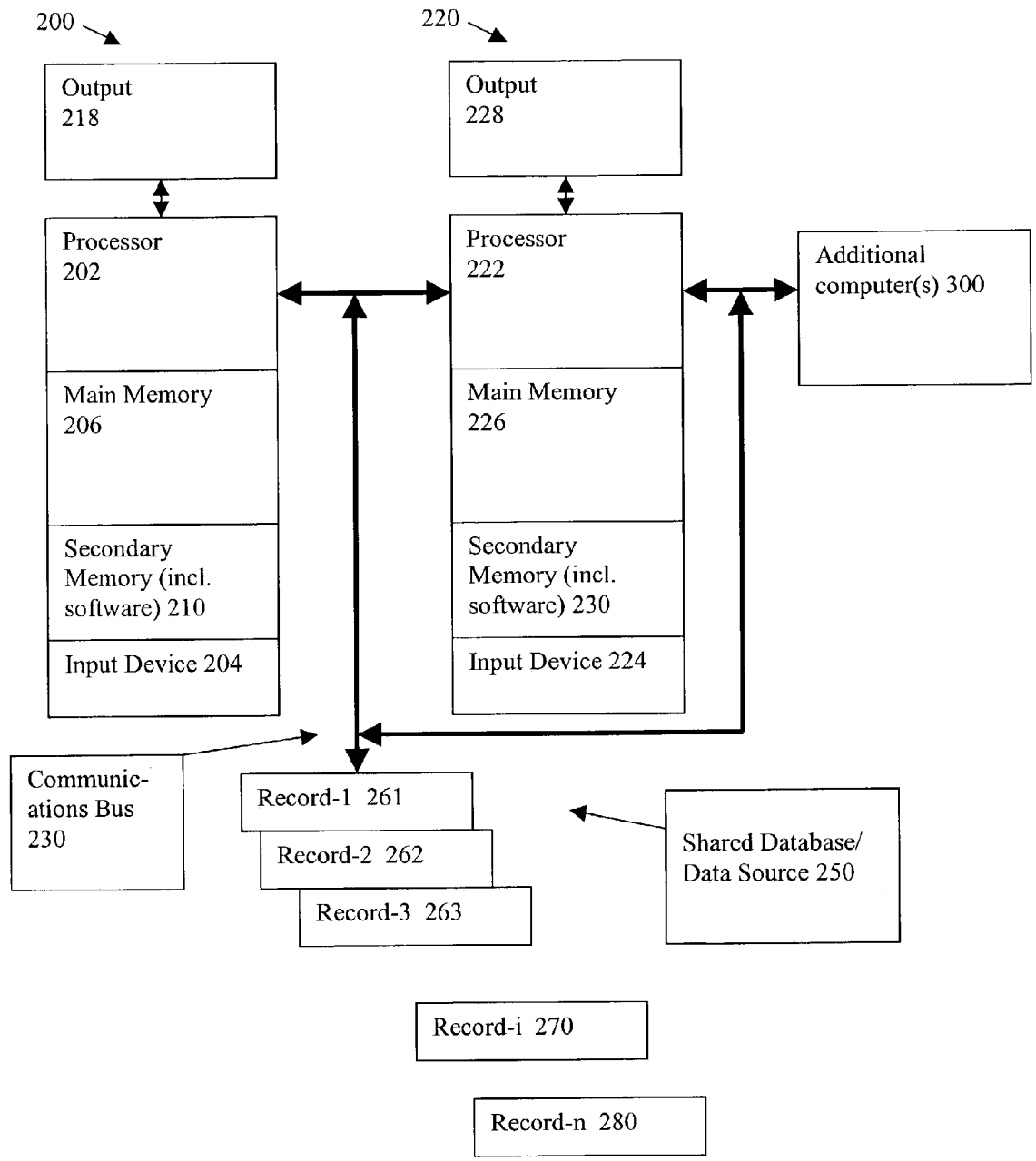
FIG. 1 shows an overview of a data processing system with two or more processors that can access a computerized data source containing the set of records of interest.

FIG. 1 shows a data processing system in which the present invention may be implemented. The system includes at least one computer or data processing machine 200. In other embodiments a second computer or data processing machine 220 is present. In still other embodiments, computer or data processing machines 200 and 220 are joined by one or more additional computers or data processing machines 300.

Computer or data processing machine 200 includes a processor 202, which may be any of the widely available Intel type processors used in personal computers or may be a more specialized, higher-speed processor. The processor 202 is in communication with a main memory 206 and a secondary memory 210, which may be the storage location for software programs that implement the instructions used to perform the inventive method. The processor 202 is also in communication with an input device 204 that may be a conventional mouse or keyboard and an output device 218, which may be a screen display or a printer.

The computer or data processing machine 220 is similar. It includes a processor 222, which again may be any of the widely available Intel type processors used in personal computers or may be a more specialized, higher-speed processor. The processor 222 is in communication with a main memory 226 and a secondary memory 230, which may be the storage location for software programs that implement the instructions used to perform the inventive method. The processor 222 is also in communication with an input device 224 and a device 228, which may display output or be controlled by it, when the output includes a control signal.

The software may be in the form of source code that is compiled to become executable, that is directly executable as written (e.g., written in a scripting language) or that is interpreted to become executable. The instructions may be stored in any form of memory, from which they are executable, directly or indirectly.

The computers or data processing machines 200 and 220 communicate with each other via a communications bus 230, which also permits either to communicate with the shared data source 250. If additional processors are needed to handle processing of data, then additional computers 300 may be connected to computer 220 and may share access to the shared data source 250.

The shared data source 250 contains multiple records (for example n records) 261, 262, 263, . . . , 270, . . . 280. These records contain the stored attribute patterns of interest and any auxiliary attributes that will be subject to the methods of the present invention.

The method that the present system uses for analyzing patterns makes use of a binomial number system representation to encode data, in particular, attribute patterns. Binomial number systems are discussed in greater detail in section 5.1.2. Although binomial number systems have been known for some time, they have not been widely used in practical applications. One practical use of the binomial number system has been in the data layout architectures for computer disk arrays (RAID). There also exist references to binomial number systems within certain texts. For more information on binomial number systems and the RAID application see the following references.

1. Donald E. Knuth; The Art of Computer Programming, Volume 3: Sorting and Searching. Addison-Wesley. The section on "Retrieval of Secondary Keys" makes reference a special case of the binomial number system, but not by name.
2. Graham, Knuth, and Patashnik; Concrete Mathematics, A foundation for Computer Science. Addison-Wesley. [See index for precise page]. Discussion here is only of a special case.
3. Tolerating Multiple Failures in RAID Architectures with Optimal Storage and Uniform Declustering; Guillermo A. Alvarez, Walter A. Burkhard, Flaviu Cristian. In Proc. of the 24th Annual ACM/IEEE International Symposium on Computer Architecture (ISCA'97), Denver, Colo., June 1997.

Section 5.1.2 includes information that has proven to be useful in the implementation of this system in software and is included for thoroughness. By way of introduction, a definition of a binomial number system used to map a set of attributes found in a data source into a key value (that is, to encode the attribute pattern) is given.

Definition 1 [Binomial Number System] Suppose integers N, k are given such that $1 \leq k \leq N$. For any n such that $$0 \leq n < \binom{N}{k},$$

there exists a unique increasing sequence of integers $0 \leq w_1 < w_2 < \ldots < w_k < N$ such that $$n = \sum_{j=1}^{k} \binom{w_j}{j}. \text{ Where } \binom{w_j}{j}$$

denotes the number of combinations "$w_j$ choose j". That is, the number of combinations, disregarding order, of $w_j$ items taking j items at a time. Furthermore, the map $$\sum_{j=1}^{k} \binom{w_j}{j}$$

defines a bijection from the set of increasing sequences of k integers with $0 \leq w_1 < w_2 < \ldots < w_k < N$ to integers greater than or equal to 0 and less than "N choose k". (A function is bijective or a bijection or a one-to-one correspondence if it is both injective (no two values map to the same value) and surjective (for every element of the co-domain there is some element of the domain which maps to it), i.e. there is exactly one element of the domain which maps to each element of the co-domain. The above bijection is conventionally referred to as the binomial number system.

Binomial number systems are useful to define keys used in the data processing contemplated by this invention for many reasons. Some of these reasons are:

1. There is more than one map that establishes a binomial number system. Most references refer to the standard binomial number system as the binomial number system. Note this map does not depend on N. From a practical viewpoint, this means one does need to know the maximum value of the sequence entries in order to calculate the mapping. In addition, the other bijections are of practical use and are incorporated into the system. The data processing system can make use of all forms of these number systems.
2. These bijections have a relatively simple functional form making it easy calculate.
3. These bijections are easy to invert, which allows the data processing system to maintain a simpler representation of the patterns, while still being able to provide a client a human usable form of the calculations.

From a practical point of view, the properties of binomial number systems enable a scalable and maintainable software-based system for encoding data to facilitate analyzing patterns.

The system parses data from real world computerized records stored in shared data source 250. To facilitate the systematic definition of patterns and the computations involving such patterns, it transforms (or maps) the data by use of combinatorial number systems, such as, binomial number systems, into internally usable, readily accessible records from which it generates and then tracks the patterns of interest appearing in the data. The use of such number systems is beneficial, because it becomes easier to maintain and scale the processing of the system as the number of records analyzed increases. Although the data processing system is more sensitive to the number of attributes considered during computation than it is to the number of records, in practice this has not been a problem.

When the data processing system finishes calculating an internal answer, the transformation or mapping into a binomial number system is reversed, so that a real world representation of the answer may be produced in accordance with the attributes of interest. An internal answer is the results of calculations performed by the system, in accordance with its configuration, which has been set up to answer questions about the data.

Figure 2:
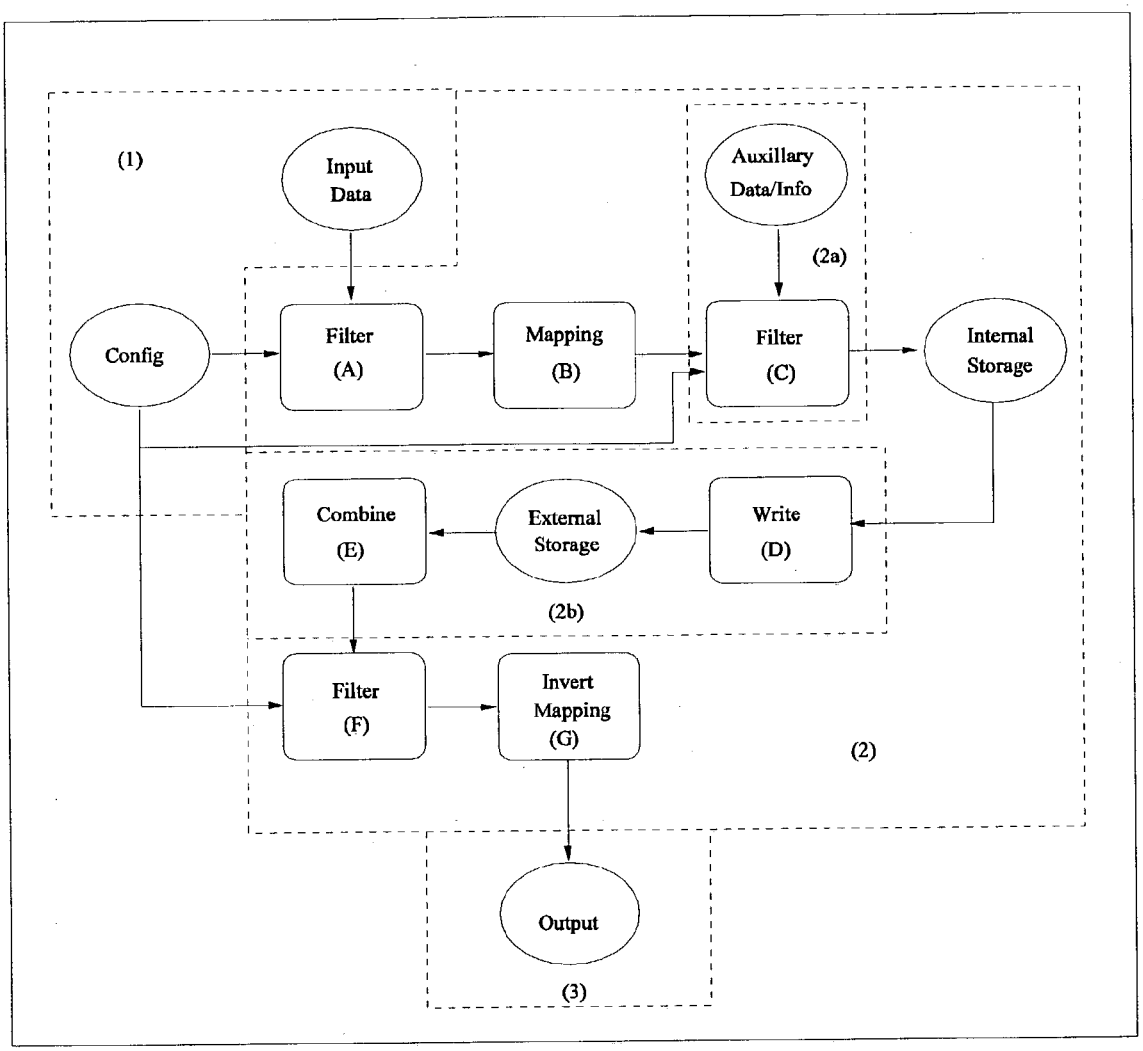
FIG. 2 shows the present invention to depict the operational aspects of the system.

The following further detailed description follows the implementation of this invention as illustrated in FIG. 2. FIG. 2 has five main components, including An interface (1) from which to configure the data processing system and a method by which the system identifies input in the form of data.

Stage (2), with substages (2a) and (2b) represent most of the processing of the system, providing mechanisms for importation of data, processing of data, and exportation of results in accordance with the configuration of the system. The process steps denoted by (A)–(G) indicate specific internal processing of the system and will be discussed later.

Stage (3) provides an output mechanism in which external agents may receive and interact with results of system processing. The external agents may be humans, intelligent machines or controlled devices.

As noted above, this invention deals with understanding patterns within computerized data. More particularly, the invention determines the frequency of pattern occurrence, and other computable information that may be pertinent to understanding the patterns. In section 5.1.1, definitions and terminology that will be useful in defining the general setting from which this invention analyzes patterns within computerized data are first introduced. Then a formal description of a distribution of patterns is given, followed by an example to aid interpreting this formalism. After which a general setting is introduced and generalized distribution of patterns are discussed.

Section 5.1.2 constructs binomial number systems by considering a recursion formula. The connection between such recursions and binomial number systems is not only interesting, but has been useful in practice. Section 5.1.2 is the most mathematically oriented of all sections and, as such, may be more challenging to follow than the others. It is included because the construction illustrates certain aspects about binomial number systems as applied in the present invention.

The remaining subsections of section 5 are summarized as follows:

1. Section 5.1.3 builds on 5.1.2 and introduces other bijections.
2. Section 5.1.4 introduces formalism to describe useful information that this invention can track about the patterns.
3. Section 5.2 presents a few usage examples of the present invention.
4. Section 5.3 presents an overview of the invention's scalability features.
5. Section 5.4 presents the sample data source applications of the present invention. A data source may include, but is not limited to, databases, files, and data streams.

5.1.1 Definitions and Terminology

In the following, the symbol A is used to indicate a set of attributes that may appear in a record, and the symbol A' is used to indicate a set of auxiliary attributes that may also appear as part of a record.

To every element, a, of A, there exists a unique positive integer assigned for encoding. One skilled in the art should have no trouble distinguishing the reference to an attribute from reference to an attribute represented as an encoded value. When no ambiguity arises, references to an attribute and its encoded value are used interchangeably. The understanding is that the attribute is the real world terminology and the encoded value is the internal system reference assigned for aiding computation and analysis. For example, the attribute "male" will be associated with the internal system value for male.

In a similar manner, an element a' of A' has an encoded value that may be used interchangeably for reference.

A basic entry (or entry) refers to an attribute and auxiliary attribute pair. The auxiliary attribute may be null.

A basic record (or record) refers to a finite collection of entries which are sorted in increasing order with respect to the attribute keys. Records may be represented by an array (or product) of the form $$(a_1, a'_1)(a_2, a'_2) \ldots (a_s, a'_s)$$

where $0 \leq a_1 < a_2 < \ldots < a_s < N$. More complicated records will be considered later.

An attribute pattern of length k (or a k-pattern for short), is an increasing sequence of attributes, $0 \leq a_1 < a_2 < \ldots < a_k < N$. Because the binomial number system establishes a bijection between k-patterns and keys comprising non-negative integers less than N choose k, one can refer to the k-pattern from the mapped key value and k. The many different possible k-patterns of increasing numbers of attributes are the patterns that are the subject of analysis in this system. The occurrence of these k-patterns is fundamental to data mining.

Let $\Re$, be a finite collection of records. The distribution of k-patterns of $\Re$ is given by the product $$\bigotimes_j (P_j^{(k)}, \#P_j^{(k)}),$$

where the "product over j" is over all k-patterns, denoted by $P^{(k)}j$, for which a sub-sequence of the attributes of some record of $\Re$ exist and maps to $P^{(k)}j$ via a binomial number system. $\#P^{(k)}_j$ denotes the cardinality (or occurrence count) of the particular k-pattern $P^{(k)}_j$ among records of $\Re$.

The "distribution of patterns" of $\Re$ is then represented by a direct sum over the distribution of k-patterns, given by $$\bigoplus_{k=1}^{S} \left\{ \bigotimes_j (P_j^{(k)}, \#P_j^{(k)}) \right\}_k,$$

where S is the maximal size of all records of $\Re$.

Consider the following example of a collection of 2 records. In this example, the auxiliary attributes are null and have been omitted.

Let $\Re = \{r_1, r_2\}$ where $r_1 = \{(1), (2)\}$ and $r_2 = \{(1), (2), (3)\}$. The first record, $r_1$, has attributes 1 and 2. The second record, $r_2$, has attributes 1, 2 and 3. The distribution of 1-patterns, 2-patterns, and 3-patterns in this limited set of records is:

$$1\text{-patterns} = \{(1, 2) \otimes (2, 2) \otimes (3, 1)\}_1$$

$$2\text{-patterns} = \left\{ \left( \binom{1}{1} + \binom{2}{2}, 2 \right) \otimes \left( \binom{1}{1} + \binom{3}{2}, 1 \right) \otimes \left( \binom{2}{1} + \binom{3}{2}, 1 \right) \right\}_2$$

$$= \{(2, 2) \otimes (4, 1) \otimes (5, 1)\}_2$$

$$3\text{-patterns} = \left\{ \left( \binom{1}{1} + \binom{2}{2} + \binom{3}{3}, 1 \right) \right\}_3$$

$$= \{(3, 1)\}_3.$$

The basic distribution of patterns for this choice of $\Re$ is $$\{(1,2)(2,2)(3,1)\}_1 \{(2,2)(4,1)(5,1)\}_2 \{(3,1)\}_3.$$

Had the auxiliary attributes not been null, the distribution could be augmented to define keys for and encode information about the patterns within the auxiliary attributes. Furthermore, there is no particular reason to consider only one auxiliary attribute. In which case, a record generalizes to the form $$(a_1(0), a_1(1), \ldots, a_1(q))(a_2(0), a_2(1), \ldots, a_2(q)) \ldots \times (a_s(0), a_s(1), \ldots, a_s(q)).$$

Although arbitrary, the $0^{th}$ term is usually considered the attribute, and the others are auxiliary attributes. Furthermore, although one may consider an infinite list of attributes and auxiliary attributes in which only a finite number are not null, this case will not be formalized here because one trained in the art will appreciate that it is needless formalism. The distribution of patterns may be generalized to $$\bigoplus_{k=1}^{S} \left\{ \bigotimes_j (P_j^{(k)}, \#P_j^{(k)} \mathfrak{I}^{(k)}(P_j^{(k)})) \right\}_k.$$

Where $\mathfrak{I}^{(k)}(P^{(k)}_j)$ denotes information about the pattern, which depends on the pattern, $P^{(k)}_j$, all the attributes and auxiliary attributes of the records of $\Re$ which contributed to $P^{(k)}_j$, and k. The information about a pattern is usually chosen to be additive in the following sense: the total information associated to a pattern from its contributing records may be calculated by first partitioning these records. The pattern information from each partition is calculated and the total pattern information may be constructed by combining these partial results from each partition created. Moreover, the pattern information is independent of the partitioning, which means that no matter what partition of records is chosen, the total pattern information evaluates to the same. The cardinality (or occurrence information) of a pattern is an example of such additivity. The cardinality has proven to be of such utility that it is represented separately as the second coordinate of a distribution of k-patterns.

Since the wording can become extremely cumbersome, we use the phrase distribution of patterns to refer to k-patterns, generalized patterns, etc.

We define a distribution of patterns, generalized or otherwise, to be a representation in accordance with the above, complete or some sub-set of the totality of patterns present in a set of records, in which the patterns are encoded by a representation (a key) in accordance with a binomial number system, or some equivalent one-to-one, invertible representation. In section 5.1.2, it is shown that there are other mappings, besides the above binomial number system, that possess important properties that give utility to the present invention. For example, a system could encode attribute patterns by using keys defined by decreasing sub-sequences as opposed to increasing sub-sequence. Both are useful and for this invention are considered equivalent.

5.1.2 Binomial Number Systems Used to Specify Keys

Suppose integers N, k are given such that $1 \leq k \leq N$. For any n such that $$0 \leq n < \binom{N}{k},$$

there exists a unique increasing sequence of integers $0 \leq w_1 < w_2 < \ldots < w_k < N$ such that $$n = \sum_{j=1}^{k} \binom{w_j}{j}. \text{ Where } \binom{w_j}{j}$$

denotes the number of combinations "$w_j$ choose j". That is, the number of combinations, disregarding order, of $w_j$ items that may appear in a record, taking j items at a time.

Furthermore, the map $$\sum_{j=1}^{k} \binom{w_j}{j}$$

defines a bijection from the set of increasing sequences of k integers with $0 \leq w_1 < w_2 < \ldots < w_k < N$ to integers greater than or equal to 0 and less than "N choose k". This bijection defines a binomial number system, used in this invention as a key to represent attribute patterns that may appear in a record and may be selected for pattern analysis.

In the following, one possible construction of binomial number systems used to encode attribute patterns into corresponding keys is provided. A recursion relation will yield the needed bijection. The following construction yields more than one bijection. For this reason, this specification refers to a binomial number system and not the binomial number system.

Before describing the general recursion, let's consider a couple of examples beginning with k=1. In this case, "N choose 1" is always equal to N and the desired map of a record could be the identity map. Define the matrix $M^{N;1}$ to be the N×N identity matrix given by:

$$M^{N;1} = \begin{bmatrix} 1 & 0 & 0 & 0 & \ldots & 0 \\ 0 & 1 & 0 & 0 & \ldots & 0 \\ 0 & 0 & 1 & 0 & \ldots & 0 \\ & & & \vdots & & \\ 0 & 0 & 0 & \ldots & 0 & 1 \end{bmatrix}$$

Notice that in this case, increasing "sequences" are sequences with only one entry. Furthermore, the $i^{th}$ row of the identity matrix has only a 1 in the $i^{th}$ column. The identity map yields a bijection for the k=1 case. Let's now consider the case where N=3 and k=2. Define the matrix $M^{3;2}$ to be $$M^{3;2} = \begin{bmatrix} 1 & 1 & 0 \\ 1 & 0 & 1 \\ 0 & 1 & 1 \end{bmatrix}$$

In exactly an analogous fashion, this matrix defines a bijection from increasing pairs {{1,2}, {1,3}, {2,3}} to the co-domain {1,2,3}.

As mentioned above, the base case for the recursion will be the identity matrix, we now define the matrix $M^{N;k}$ for a bijection from any level of k-pattern to a desired co-domain by the recurrence relation:

$$M^{N;k} = \begin{bmatrix} 1 & & & & \\ 1 & & & & \\ & & M^{N-1;k-1} & & \\ \vdots & & & & \\ 1 & & & & \\ 0 & 1 & & & \\ 0 & 1 & & & \\ & & M^{N-2;k-1} & & \\ \vdots & \vdots & & & \\ 0 & 1 & & & \\ \vdots & \vdots & & & \\ 0 & \ldots & 1 & M^{k-1;k-1} \end{bmatrix}$$

Although at first sight this may look ominous, the nesting that occurs in the recursion has some very special properties. These properties will enable us to readily construct a general from of the bijection that enumerates a binomial number system.

The idea is to identify pivot rows in the matrices $M^{N;k}$, and then construct a formula that maps the attributes contained in increasing k-tuples (or k-patterns) to the appropriate integer in the set.

$$\left\{1, 2, \cdots, \binom{N}{k}\right\}.$$

A pivot row refers to a row of $M^{N;k}$ in which the number of leading 0's from left to right increases from the previous row. This process of identifying the pivots for different values of N and k may be continued. The pivots will now be tabulated, and the formula for an enumeration of a binomial number system is identified. For exemplary purposes, the pivots are tabulated for the cases k=2,3, and 4. Table entries with "." have a value, but the value has not been stated in the table. Furthermore, note that these tables are boundless in all parameters and the tables presented are only portions of the actual tables. As such, only some of the values have been included.

| Pivots for k = 2 | | | | | | | |
|---|---|---|---|---|---|---|---|
| N\i | 1 | 2 | 3 | 4 | 5 | 6 | 7 |
| 2 | 1 | . | . | . | . | . | . |
| 3 | 1 | 3 | . | . | . | . | . |
| 4 | 1 | 4 | 6 | . | . | . | . |
| 5 | 1 | 5 | 8 | 10 | . | . | . |
| 6 | 1 | 6 | 10 | 13 | 15 | . | . |
| 7 | 1 | 7 | 12 | 16 | 19 | 21 | . |
| 8 | 1 | 8 | 14 | 19 | 23 | 26 | 28 |

| Pivots for k = 3 | | | | | | |
|---|---|---|---|---|---|---|
| N\i | 1 | 2 | 3 | 4 | 5 | 6 |
| 3 | 1 | . | . | . | . | . |
| 4 | 1 | 4 | . | . | . | . |
| 5 | 1 | 7 | 10 | . | . | . |
| 6 | 1 | 11 | 17 | 20 | . | . |
| 7 | 1 | 16 | 26 | 32 | 35 | . |
| 8 | 1 | 22 | 37 | 47 | 53 | 56 |

| Pivots for k = 4 | | | | | |
|---|---|---|---|---|---|
| N\i | 1 | 2 | 3 | 4 | 5 |
| 4 | 1 | . | . | . | . |
| 5 | 1 | 5 | . | . | . |
| 6 | 1 | 11 | 15 | . | . |
| 7 | 1 | 21 | 31 | 35 | . |
| 8 | 1 | 36 | 56 | 66 | 70 |

If the tables are transformed so that the diagonals are aligned along the columns, one has

| Pivots for k = 2 | | | | | | | |
|---|---|---|---|---|---|---|---|
| i\N-i | 1 | 2 | 3 | 4 | 5 | 6 | 7 |
| 1 | 1 | 1 | 1 | 1 | 1 | 1 | 1 |
| 2 | 3 | 4 | 5 | 6 | 7 | 8 | . |
| 3 | 6 | 8 | 10 | 12 | 14 | . | . |
| 4 | 10 | 13 | 16 | 19 | . | . | . |
| 5 | 15 | 19 | 23 | . | . | . | . |
| 6 | 21 | 26 | . | . | . | . | . |
| 7 | 28 | . | . | . | . | . | . |

| Pivots for k = 3 | | | | | | |
|---|---|---|---|---|---|---|
| i\N-i-1 | 1 | 2 | 3 | 4 | 5 | 6 |
| 1 | 1 | 1 | 1 | 1 | 1 | 1 |
| 2 | 4 | 7 | 11 | 16 | 22 | . |
| 3 | 10 | 17 | 26 | 37 | . | . |
| 4 | 20 | 32 | 47 | . | . | . |
| 5 | 35 | 53 | . | . | . | . |
| 6 | 56 | . | . | . | . | . |

| Pivots for k = 4 | | | | | |
|---|---|---|---|---|---|
| i\N-i-2 | 1 | 2 | 3 | 4 | 5 |
| 1 | 1 | 1 | 1 | 1 | 1 |
| 2 | 5 | 11 | 21 | 36 | . |
| 3 | 15 | 31 | 56 | . | . |
| 4 | 35 | 66 | . | . | . |
| 5 | 70 | . | . | . | . |

It can be seen that in the general case, the offset is N−i−k+2. In addition, each table may be derived from the values in its first column. Shortly, this property will prove to be quite useful. Constructing a new table using the first columns of each possible such previous table gives the following table.

| l\m | 1 | 2 | 3 | 4 | . |
|---|---|---|---|---|---|
| 1 | 1 | 1 | 1 | 1 | 1 |
| 2 | 2 | 3 | 4 | 5 | . |
| 3 | 3 | 6 | 10 | 15 | . |
| 4 | 4 | 10 | 20 | 35 | . |
| 5 | 5 | 15 | 35 | 70 | . |
| 6 | 6 | 21 | 56 | . | . |
| 7 | 7 | 28 | . | . | . |
| . | | | | | |

This table is a version of Pascal's triangle. In the common form of Pascal's triangle, a column in our table is seen along diagonals. The first diagonal is of no particular use to us and the second diagonal is in many respects trivial. Nonetheless, it corresponds to case k=1 with the corresponding matrix being the identity matrix. For completeness, Pascal's triangle is included here now.

```
                        1
                     1     1
                  1     2     1
               1     3     3     1
            1     4     6     4     1
         1     5    10    10     5     1
      1     6    15    20    15     6     1
   1     7    21    35    35    21     7     1
1     8    28    56    70    56    28     8     1
   1  9    36    84   126   126    84    36     9     1
. . . . . . . . . . .
```

Define $\Omega$ to be the semi-infinite matrix given by the table above, that is, $\Omega(i,j)$ is given by the entry in the $i^{th}$ row and the $j^{th}$ column.

$$\Omega = \begin{pmatrix} 1 & 1 & 1 & 1 & \cdot & \cdot \\ 2 & 3 & 4 & 5 & \cdot & \cdot \\ 3 & 6 & 10 & 15 & \cdot & \cdot \\ 4 & 10 & 20 & 35 & \cdot & \cdot \\ 5 & 15 & 35 & 70 & \cdot & \cdot \\ 6 & 21 & 56 & \cdot & \cdot & \cdot \\ 7 & 28 & \cdot & \cdot & \cdot & \cdot \\ \cdot & \cdot & \cdot & \cdot & \cdot & \cdot \\ \cdot & \cdot & \cdot & \cdot & \cdot & \cdot \end{pmatrix}$$

Columns of $\Omega$ may be defined from the previous column by:

$$\Omega = \Omega(N, k) = \begin{cases} N & : k = 1 \\ \sum_{l=1}^{N} \Omega(1, k-1) & : k \text{ otherwise} \end{cases}$$

Now define the sequence of matrices $\Omega^k$ by $\Omega^{(k)}(i,j) = \Omega(j+i-1,k) - \Omega(j,k) + 1$.

$$\Omega^{(k)}(i, N-i-k+2) = \Omega(N-i-k+2+i-1, k) - \Omega(N-i-k+2, k) + 1$$

$$\Pi^{(k)}(N, i) = \Omega^{(k)}(N, i) = \Omega^{(k)}(i, N-i-k+2) - 1$$
$$= \Omega(N-k+1, k) = -\Omega(N-i-k+2, k)$$

Let $w = \{w_1, w_2, \ldots, w_k\}$ be an increasing sequence of integers between 1 and N. We will adopt the convention that $w_0 = 0$. An enumeration of the set $$\left\{1, 2, \ldots, \binom{N}{k}\right\}$$

is given by the map $$1 + \sum_{\alpha=1}^{k} \Pi^{(k-\alpha+1)}(N - w_{\alpha-1}, w_\alpha - w_{\alpha-1}).$$

Now substituting binomial coefficients in the above formula, the map becomes $$\sum_{\alpha=1}^{k} \binom{N-w_\alpha}{k-\alpha}\left(\frac{[(N-w_\alpha)-(k-\alpha)]}{[(k-\alpha)+1]}\right)$$

Reducing this formula gives $$\sum_{\alpha=1}^{k} \binom{N-w_\alpha}{k-\alpha+1}$$

The dependence on N may be removed by considering $w_\alpha \to N - w_\alpha$ which gives a formula for a decreasing sequence $$\sum_{\alpha=1}^{k} \binom{w_\alpha - 1}{k - \alpha + 1}$$

and then noticing that increasing sequences of the form $0 \leq w_1 < w_2 < \ldots < w_k < N$ may be considered with the map being $$\sum_{\alpha=1}^{k} \binom{w_\alpha}{\alpha}.$$

This map usually defines the binomial number system establishing a bijection between increasing sequences $(w_1, w_2, \ldots, w_k)$ such that $0 \leq w_1 < w_2 < \ldots < w_k < N$ to the set of integers $$\left\{0, 1, 2, \ldots, \binom{N}{k} - 1\right\}.$$

The above binomial number systems permit an enumeration patterns and mapping of attributes into a co-domain of keys suitable for further analysis of all k-patterns with 1, 2, 3 or more attributes, continuing to whatever value of k is desired, consistent with computing resources available. The enumeration involves no testing for thresholds of support or confidence. All k-patterns that are part of the analysis and found in the records can be enumerated with such a number system. Also, because of the qualities of a binomial number system, if main memory limits on storage are reached as distribution pattern results are developed, these results mapped into the binomial number system can be moved out to secondary storage or to another computer. Due to the additive properties referred to above that are a characteristic of the keys into which attribute patterns are mapped, the partial results can then be retrieved and combined with other partial results as needed to continue or complete the computation interrupted by the main memory limitation.

Although secondary storage limits are less often reached, the same principle can be used to store and retrieve and recombine partial results that need to be stored on additional secondary storage, e.g., storage from another computer system. By further extension, not just the results can be partitioned as various partial results calculated reach storage limits. With duplicate copies of the software using the same binomial number system or a complementary one and accessing the same data source, the development of the partial results can itself be partitioned across multiple data processing systems and independently developed partial results can be recombined.

This permits software to be written that is capable of processing a very large collection of records and, using the selected binomial number system, to define a virtual space subdivided by keys for keeping track of the information on distribution patterns found in the records. The system on which the software runs need not allocate storage for all possible patterns pre-defined in the virtual space. It will simply take additional storage to hold complete or partial distribution pattern results for all instances of any k-pattern that it actually encounters in processing records in the data source analyzed.

5.1.3 Other Important Bijections Used to Define Keys

The fundamental reasons for considering other bijections for defining the keys into which attribute patterns found in a data source may be encoded are two-fold. The first reason is to extend the domain of applicable attribute inputs. The second is to modify the co-domain in order to avoid collisions when overloading the range of key values.

The above derivation of the binomial number system used to define keys illustrates that the starting point for such an enumeration of k-patterns with a set of records is arbitrary and that mappings of attribute patterns to keys which have been shifted by a constant may also be considered as a binomial number system and are of practical use when constructing multiple distributions of patterns on a single pass through data sources. For example, the offset may be used to encode the value k of the k-pattern. In such a case, one needs only the mapped value to determine the pattern. The value of k has also been encoded and may be recovered from the key's value. Let the shift, S, be given. An example of a shifted binomial number system is given by the map $$S + \sum_{\alpha=1}^{k} \binom{w_\alpha}{\alpha}.$$

Although some of the other bijections depend on knowing the maximum value of the sequence entries, it is still of practical interest to consider these bijections. An interesting example is when encoding the k associated with a k-pattern that is being analyzed. A collection of N attributes has $2^N$ subsets. Since order does not matter, a subset may be considered to be an increasing sequence. In this case, the mapping $$\sum_{i:i<k} \binom{N}{i} + \sum_{\alpha=1}^{k} \binom{w_\alpha}{\alpha}$$

defines a bijection between non-repeating subsets of N attributes and non-negative integers less than or equal to $2^N$. The null subset is mapped, by definition, to 0.

The following example shows specifically how the shifted binomial number system can be used to encode all the k-patterns, that is, to define a key for any k-pattern that may be encountered in a data source.

Consider sample attributes numbered {0, 1, 2, 3, 4}, that is N=5. Of course, in practice not all k-patterns defined by a mapping may need to be generated when any given data source is processed, but this shows how the full layout of possible k-patterns for this attribute domain and the definition of corresponding keys may occur.

k=0

This case corresponds to the null set and maps to 0.

$$(w_a) \to \binom{N}{0} + w_\alpha = 1 + w_\alpha \quad k=1$$

$(0) \to 1 + 0 = 1$
$(1) \to 1 + 1 = 2$
$(2) \to 1 + 2 = 3$
$(3) \to 1 + 3 = 4$
$(4) \to 1 + 4 = 5$

-continued $$\binom{N}{0} + \binom{N}{1} + \binom{w_1}{1} + \binom{w_2}{2} \quad k=2$$

$$\binom{5}{0} + \binom{5}{1} + \binom{w_1}{1} + \binom{w_2}{2} = 6 + \binom{w_1}{1} + \binom{w_2}{2}$$

$(0, 1) \to 6 + \binom{0}{1} + \binom{1}{2} = 6$ $(0, 2) \to 6 + \binom{0}{1} + \binom{2}{2} = 7$ $(1, 2) \to 6 + \binom{1}{1} + \binom{2}{2} = 8$ $(0, 3) \to 6 + \binom{0}{1} + \binom{3}{2} = 9$ $(1, 3) \to 6 + \binom{1}{1} + \binom{3}{2} = 10$ $(2, 3) \to 6 + \binom{2}{1} + \binom{3}{2} = 11$ $(0, 4) \to 6 + \binom{0}{1} + \binom{4}{2} = 12$ $(1, 4) \to 6 + \binom{1}{1} + \binom{4}{2} = 13$ $(2, 4) \to 6 + \binom{2}{1} + \binom{4}{2} = 14$ $(3, 4) \to 6 + \binom{3}{1} + \binom{4}{2} = 15$ $$\binom{N}{0} + \binom{N}{1} + \binom{N}{2} + \binom{w_1}{1} + \binom{w_2}{2} + \binom{w_3}{3} \quad k=3$$

$$\binom{5}{0} + \binom{5}{1} + \binom{5}{2} + \binom{w_1}{1} + \binom{w_2}{2} + \binom{w_3}{3} =$$

$$16 + \binom{w_1}{1} + \binom{w_2}{2} + \binom{w_3}{3}$$

$(0, 1, 2) \to 16 + \binom{0}{1} + \binom{1}{2} + \binom{2}{3} = 16$ $(0, 1, 3) \to 16 + \binom{0}{1} + \binom{1}{2} + \binom{3}{3} = 17$ $(0, 2, 3) \to 16 + \binom{0}{1} + \binom{2}{2} + \binom{3}{3} = 18$ $(1, 2, 3) \to 16 + \binom{1}{1} + \binom{2}{2} + \binom{3}{3} = 19$ $(0, 1, 4) \to 16 + \binom{0}{1} + \binom{1}{2} + \binom{4}{3} = 20$ $(0, 2, 4) \to 16 + \binom{0}{1} + \binom{2}{2} + \binom{4}{3} = 21$ $(1, 2, 4) \to 16 + \binom{1}{1} + \binom{2}{2} + \binom{4}{3} = 22$ $(0, 3, 4) \to 16 + \binom{0}{1} + \binom{3}{2} + \binom{4}{3} = 23$ $(1, 3, 4) \to 16 + \binom{1}{1} + \binom{3}{2} + \binom{4}{3} = 24$ $(2, 3, 4) \to 16 + \binom{2}{1} + \binom{3}{2} + \binom{4}{3} = 25$ -continued $$\binom{N}{0}+\binom{N}{1}+\binom{N}{2}+\binom{N}{3}+\binom{w_1}{1}+\binom{w_2}{2}+\binom{w_3}{3}+\binom{w_4}{4} \quad k=4$$

$$\binom{5}{0}+\binom{5}{1}+\binom{5}{2}+\binom{5}{3}+\binom{w_1}{1}+\binom{w_2}{2}+\binom{w_3}{3}+\binom{w_4}{4}=$$

$$26+\binom{w_1}{1}+\binom{w_2}{2}+\binom{w_3}{3}+\binom{w_4}{4}$$

$$(0,1,2,3) \to 26+\binom{0}{1}+\binom{1}{2}+\binom{2}{3}+\binom{3}{4}=26$$

$$(0,1,2,4) \to 26+\binom{0}{1}+\binom{1}{2}+\binom{2}{3}+\binom{4}{4}=27$$

$$(0,1,3,4) \to 26+\binom{0}{1}+\binom{1}{2}+\binom{3}{3}+\binom{4}{4}=28$$

$$(0,2,3,4) \to 26+\binom{0}{1}+\binom{2}{2}+\binom{3}{3}+\binom{4}{3}=29$$

$$(1,2,3,4) \to 26+\binom{1}{1}+\binom{2}{2}+\binom{3}{3}+\binom{4}{3}=30$$

$$\binom{N}{0}+\binom{N}{1}+\binom{N}{2}+\binom{N}{3}+\binom{N}{4}+ \quad k=5$$

$$\binom{w_1}{1}+\binom{w_2}{2}+\binom{w_3}{3}+\binom{w_4}{4}+\binom{w_5}{5}$$

$$(0,1,2,3,4) \to 31+\binom{0}{1}+\binom{1}{2}+\binom{2}{3}+\binom{3}{4}+\binom{4}{5}=31$$

Thus, each attribute is assigned an integer value and for each k-pattern possible within the defined domain of attributes, a unique integer key-value may be defined. As records from a data source containing the various attribute patterns are processed, the occurrence of any given k-pattern can be tracked by building an occurrence count associated with the key for that k-pattern. The resulting keys make the data for any occurring k-pattern easily accessible.

There are two other bijections that result from the derivation of the binomial number system that depend on N and are worth noting as alternatives for developing keys. If we consider increasing sequences such that $1 \leq w_1 < w_2 < \ldots < w_k \leq N$, the following bijections are available for use:

$$\sum_{\alpha=1}^{k} \binom{N-w_\alpha}{k-\alpha+1}$$

and $$N - \sum_{\alpha=1}^{k} \binom{N-w_\alpha}{k-\alpha+1}.$$

In addition, the following bijection extends the domain of the present invention to sequences which may not be strictly increasing. This is done by shifting each coordinate by use of the "value" of the coordinate, as follows $(w_1, w_2, \ldots, w_k) \to (w_1, w_2+1, \ldots, w_k+k-1)$, and the corresponding bijection is given by $$\sum_{\alpha=1}^{k} \binom{w_\alpha + \alpha - 1}{\alpha}.$$

This mapping allows one to define the keys suitable to analyze patterns that are monotonically increasing, but not strictly increasing and establishes a bijection between increasing sequences $(w_1, w_2, \ldots, w_k)$ such that $0 \leq w_1 \leq w_2 \leq \ldots \leq w_k < N$ to the set of integers $$\left\{0, 1, 2, \ldots, \binom{N+k-1}{k}-1\right\}.$$

The following example shows how this bijection works for the sample attributes numbered $\{0, 1, 2, 3, 4\}$.

EXAMPLE

Let $N = 4$ and $k = 2$.

$$(0,0) \to (0,1) \to \binom{0}{1}+\binom{1}{2}=0$$

$$(0,1) \to (0,2) \to \binom{0}{1}+\binom{2}{2}=1$$

$$(1,1) \to (1,2) \to \binom{1}{1}+\binom{2}{2}=2$$

$$(0,2) \to (0,3) \to \binom{0}{1}+\binom{3}{2}=3$$

$$(1,2) \to (1,3) \to \binom{1}{1}+\binom{3}{2}=4$$

$$(2,2) \to (2,3) \to \binom{2}{1}+\binom{3}{2}=5$$

$$(0,3) \to (0,4) \to \binom{0}{1}+\binom{4}{2}=6$$

$$(1,3) \to (1,4) \to \binom{1}{1}+\binom{4}{2}=7$$

$$(2,3) \to (2,4) \to \binom{2}{1}+\binom{4}{2}=8$$

$$(3,3) \to (3,4) \to \binom{3}{1}+\binom{4}{2}=9$$

-continued

Let $N = 4$ and $k = 3$.

$(0, 0, 0) \to (0, 1, 2) \to \binom{0}{1} + \binom{1}{2} + \binom{2}{3} = 0$ $(0, 0, 1) \to (0, 1, 3) \to \binom{0}{1} + \binom{1}{2} + \binom{3}{3} = 1$ $(0, 1, 1) \to (0, 2, 3) \to \binom{0}{1} + \binom{2}{2} + \binom{3}{3} = 2$ $(1, 1, 1) \to (1, 2, 3) \to \binom{1}{1} + \binom{2}{2} + \binom{3}{3} = 3$ $(0, 0, 2) \to (0, 1, 4) \to \binom{0}{1} + \binom{1}{2} + \binom{4}{3} = 4$ $(0, 1, 2) \to (0, 2, 4) \to \binom{0}{1} + \binom{2}{2} + \binom{4}{3} = 5$ $(1, 1, 2) \to (1, 2, 4) \to \binom{1}{1} + \binom{2}{2} + \binom{4}{3} = 6$ $(0, 2, 2) \to (0, 3, 4) \to \binom{0}{1} + \binom{3}{2} + \binom{4}{3} = 7$ $(1, 2, 2) \to (1, 3, 4) \to \binom{1}{1} + \binom{3}{2} + \binom{4}{3} = 8$ $(2, 2, 2) \to (2, 3, 4) \to \binom{2}{1} + \binom{3}{2} + \binom{4}{3} = 9$ $(0, 0, 3) \to (0, 1, 5) \to \binom{0}{1} + \binom{1}{2} + \binom{5}{3} = 10$ $(0, 1, 3) \to (0, 2, 5) \to \binom{0}{1} + \binom{2}{2} + \binom{5}{3} = 11$ $(1, 1, 3) \to (1, 2, 5) \to \binom{1}{1} + \binom{2}{2} + \binom{5}{3} = 12$ $(0, 2, 3) \to (0, 3, 5) \to \binom{0}{1} + \binom{3}{2} + \binom{5}{3} = 13$ $(1, 2, 3) \to (1, 3, 5) \to \binom{1}{1} + \binom{3}{2} + \binom{5}{3} = 14$ $(2, 2, 3) \to (2, 3, 5) \to \binom{2}{1} + \binom{3}{2} + \binom{5}{3} = 15$ $(0, 3, 3) \to (0, 4, 5) \to \binom{0}{1} + \binom{4}{2} + \binom{5}{3} = 16$ $(1, 3, 3) \to (1, 4, 5) \to \binom{1}{1} + \binom{4}{2} + \binom{5}{3} = 17$ $(2, 3, 3) \to (2, 4, 5) \to \binom{2}{1} + \binom{4}{2} + \binom{5}{3} = 18$ $(3, 3, 3) \to (3, 4, 5) \to \binom{3}{1} + \binom{4}{2} + \binom{5}{3} = 19$ Again, the simplified example shows how the bijection permits a unique integer key value to be defined for each k-pattern of possible interest.

FIG. 4 shows in schematic form the virtual space for tracking k-patterns that is defined by using the binomial number system $$\sum_{i:\, i<k} \binom{N}{i} + \sum_{\alpha=1}^{k} \binom{w_\alpha}{\alpha}$$

described above as a key generating algorithm in software implementing the invention. As can be seen, it permits the building of a virtual data structure represented in FIG. 4 as a single table. The key values provide unique reference labels for the field or fields that contain cardinality or other information developed for the k-pattern corresponding to the key as records from a data source are processed. The results stored in the data structure will typically be of interest whenever k assumes two or more non-zero values.

It can further be seen that it is possible to partition the virtual space as needed to manage memory or other computational resources available to perform the computations for various k-patterns defined. For example, if the processing of k-patterns k=0 through k=2 were (hypothetically) to exhaust available main memory, the partial results of processing up to the memory limit could be shifted out to secondary storage. Using the key labels associated with particular patterns, the partial results stored could then be returned to main memory and combined with other partial results for the same key labels. Thus, by additive combination the complete results for a full set of k-patterns can be compiled, notwithstanding main and secondary memory limits.

As a further example, if the processing of the k=2 patterns for a large number of records were (again, hypothetically) expected to take too long, a portion of the records in the data source could be processed by a second software copy using the same binomial number system (and the resulting keys) on another computer system. By use of the keys for labeling the k-pattern information, the results of the independent processing by two computer systems can again be additively combined to provide k-pattern results across the full set of records.

As a still further example of the partitioning of computation possible with the present invention, if the processing of k-patterns of any kind exhaust available secondary storage for a given system, the partial results of processing up to the point of encountering the limitation can be communicated to other storage devices (e.g., removable mass storage media). Again the system of key labels will permit the partial results sent to other storage devices to be additively combined with other partial results as needed to provide complete results.

FIG. 5 shows in schematic form the virtual space for tracking k-patterns that is defined by using a binomial number system $$\sum_{\alpha=1}^{k} \binom{w_\alpha + \alpha - 1}{\alpha}$$

described above as a key generating algorithm in software implementing the invention. As can be seen, it permits the building of a virtual data structure represented in FIG. 5 as two tables, one for each of the k-patterns for k=2, 3. The two separate tables are necessary, because the key co-domains defined have overlap. Nevertheless, the key values within any table provide unique reference labels for the field or fields that contain cardinality or other information developed for the k-patterns corresponding to those key values, as records from a data source are processed. This permits partitioning of the results for some k-patterns. By keeping track of the particular table involved, partial results for k-patterns covered by the same table or by a different table can still be additively combined.

We conclude this section by considering that the co-domain of the binomial number system is integer valued and a useful map can be derived by clearing fractions by multiplying through by $k! = k(k-1) \ldots (1)$ as follows.

$$k! \sum_{\alpha=1}^{k} \binom{w_\alpha}{\alpha}$$

$$\sum_{\alpha=1}^{k} \frac{k! \times w_\alpha!}{\alpha! \times (w_\alpha - \alpha)!}$$

$$\sum_{\alpha=1}^{k} \frac{k!}{\alpha!} \frac{w_\alpha!}{(w_\alpha - \alpha)!}$$

$$\sum_{\alpha=1}^{k} \frac{k!}{[k-(k-\alpha)]!} \frac{w_\alpha!}{(w_\alpha - \alpha)!}$$

Resulting in the map $$\sum_{\alpha=1}^{k} P(k: k-\alpha) P(w_\alpha: \alpha)$$

$$P(m: n) = \prod_{j=1}^{n} (m - n + j), \quad P(m: 0) = 1$$

The utility of the formula is that the mapping consists of only sums and products of integers, the evaluation of which can be made very efficient by software that utilizes that quality.

In an analogous manner, one can clear fractions in the mapping $$\sum_{i<k} \binom{N}{i} + \sum_{\alpha=1}^{k} \binom{w_\alpha}{\alpha}$$

by multiplying by k! to get $$k! \left\{ \sum_{i<k} \binom{N}{i} + \sum_{\alpha=1}^{k} \binom{w_\alpha}{\alpha} \right\}$$

$$\sum_{\alpha=1}^{k} k! \left( \binom{N}{\alpha-1} + \binom{w_\alpha}{\alpha} \right)$$

$$\sum_{\alpha=1}^{k} \frac{k!}{\alpha!} \left( \frac{\alpha N!}{(N-(\alpha-1))!} + \frac{w_\alpha!}{(w_\alpha-\alpha)!} \right)$$

$$\sum_{\alpha=1}^{k} P(k: k-\alpha) \{ \alpha P(N: \alpha-1) + P(w_\alpha: \alpha) \}$$

where $$P(m: n) = \prod_{j=1}^{n} (m-n+j), \quad P(m: 0) = 1$$

Again, this mapping can provide a very efficient software implementation for developing k-pattern data.

5.1.4 Functional Forms for Calculating Pattern Information

Although it is not possible to express every way in which one might develop information about the patterns found in a data source and encoded with corresponding keys as described above, some ways deserve special mention. Before presenting general forms of pattern information, we begin with some examples.

Cardinality

The most basic information of interest about a pattern appearing in data is usually its occurrence count or cardinality.

Let P be a given increasing sequence of attributes. The number of occurrences of P in $\Re$ is given by $$\#P = \sum_{\bar{r} \in \Re} \sum_{\{\bar{s} | \bar{s} \leq \bar{r}\}} 1_P(\bar{s})$$

where $$1_P(\bar{s}) = \begin{cases} 1: & \text{the attributes of } \bar{s} = P \\ 0: & \text{otherwise} \end{cases}$$

Root Mean Square

Suppose we want to understand how a large collection of records representing attributes appearing in a time series relates to one another. For each integer i, let $X_i(t)$ denote the discrete time-series, where $$X_i(t) = \{X_i(1), X_i(2), X_i(3), \ldots \}.$$

Suppose we don't understand much about these time-series records. We may consider computing the root mean square difference between each pair of time-series records up to time T (actually the squared value), given by $$RMSD(X_i, X_j)(T) = \frac{1}{T} \left\{ \sum_{t=1}^{T} [X_i(t) - X_j(t)]^2 \right\}^{\frac{1}{2}}.$$

Computing (a 2-pattern) the root mean square difference gives information about how each pair of time-series relate to one another. Symmetry tell us that we really only need to consider the case i<j (i=j is trivial). In addition, at time T each pattern (i,j) occurs T times. Notice that if we consider a record at time t to be given as $$r_t = \{X_1(t), X_2(t), X_3(t), \ldots, X_N(t)\},$$

then one can encode the information about the root mean square difference in the distribution of 2-patterns as $$\bigotimes_{1 \leq i < j \leq N} \left\{ \binom{i}{1} + \binom{j}{2}, T, \sum_{t=1}^{T} [X_i(t) - X_j(t)]^2 \right\}.$$

The normalization is given by T and the square root is omitted here, but may be incorporated afterwards. The information portion of the pattern is expressible as a sum and it can be evaluated incrementally as the records (time-series) are being parsed. It is also reasonable to suppose that three-way relationships may also be of interest. Consider the following 3-patterns $$\bigotimes_{1 \leq i < j < k \leq N} \left\{ \binom{i}{1} + \binom{j}{2} + \binom{k}{3}, T, \mathcal{J}(X_i, X_j, X_k) \right\}.$$

$$\mathcal{T}(X_i, X_j, X_k) = \sum_{t=1}^{T} [X_i(t) - X_j(t)]^2 + [X_j(t) - X_k(t)]^2 + [X_i(t) - X_k(t)]^2$$

With the present methodology, this root mean square difference analysis can be extended correspondingly to any n-pattern.

As another example using the root mean square difference, let our records be doubly indexed so that $$r_{m,1} = \{Y_1(m,1), Y_2(m,1), Y_3(m,1), \ldots, Y_N(m,1)\}$$

In this situation suppose that $1 \leq m \leq M$ and $1 \leq l \leq L$. If the $Y_i(m, 1)$ takes values 0 or 1, then the $Y_i$ may be considered as a black and white pixel image. (In a more general setting, the "image" may have color or an intensity range.) The root mean square difference can be interpreted as a metric between the images, and the distribution of 2-patterns tabulates the comparisons and maybe useful when comparing large numbers of images. This distribution of 2-patterns is $$\bigotimes_{1 \leq i < j \leq N} \left\{ \binom{i}{1} + \binom{j}{2}, T, \sum_{m=1}^{M} \sum_{l=1}^{L} [X_i(m,1) - X_j(m,1)]^2 \right\}.$$

Such a comparison might be useful in comparing x-ray or other images of a manufactured item where uniformity and variations from uniformity could be of interest. For this, each item image could be compared to a master image or the item images could be pair-wise compared to each other. Pair-wise comparison can be used to determine mean and variance of the collection of images. Thus, the distribution of 2-patterns within the image records of a population of items could be calculated using the root mean square statistic to amplify differences among images.

(Minimum)

Instead of performing a summation, it is possible to calculate the minimum of the $j^{th}$ auxiliary attribute by considering $$\min(P)_j = \min_{r \in R} \min_{\{s|\bar{s} \leq r\}} \{\min^{(P,j)}(\bar{s})\},$$

where $$\min^{(P,j)}(\bar{s}) = \begin{cases} \min(\bar{s}_j): & \text{the attributes of } \bar{s} = P \\ \infty: & \text{otherwise} \end{cases}$$

and $\bar{s}_j$ denotes the sequence of $j^{th}$ auxiliary attributes of $\bar{s}$.

(Maximum)

In an analogous fashion, instead of forming a summation, it is possible to calculate the maximum of the $j^{th}$ auxiliary attribute by considering $$\max(P)_j = \max_{r \in R} \max_{\{s|\bar{s} \leq r\}} \{\max^{(P,j)}(\bar{s})\},$$

where $$\max^{(P,j)}(\bar{s}) = \begin{cases} \min(\bar{s}_j): & \text{the attributes of } \bar{s} = P \\ -\infty: & \text{otherwise} \end{cases}$$

(Sub-pattern Mapping)

While tracking k-patterns that have occurred and storing the resulting data under the corresponding key, it is sometimes useful to record that a pattern contains particular sub-patterns. This can be done with or without the use of a binomial number system to define keys for this additional sub-pattern information.

The information relevant to analysis of a selected k-pattern is usually a collection of the above mentioned functions. Thus, the tables of FIGS. 4 and 5 show a field for cardinality and a field for all other information developed for the k-pattern represented by a particular key. As will be seen below, the fields for a k-pattern can be populated not only by distribution pattern information developed just for that k-pattern. Once the analysis for the k-patterns of interest in a set of records has been completed, the cardinality and other pattern information stored (e.g., a row of data in FIGS. 4 or 5) can itself be the subject of further analysis. The data in one row can then be augmented by meta-information that is derived from other rows. (Meta-information is usually defined as information about information. For example, it may mean information inserted in one row, i.e., for one k-pattern, that is derived from information previously developed for one or more other rows.) All of these functions have the property of being additive in the sense mentioned earlier. When a pattern is determined by the system in the encoded data, the contribution to the patterns information is calculated and incorporated. All of these functions are additive because terms may be incrementally added to previous terms which are calculated by using the next record. Thus, the same basic key defined for a given k-pattern permits partitioning and re-aggregation of partial results based on the common key values defined for partial results.

5.2 Usage Scenarios

The above techniques are applicable to the analysis of a variety of kinds of computerized data sources to find and analyze associational relationships and develop the data structures in which such associational data may be stored and from which it may be retrieved.

The possible usage scenarios for these mapping methods and the resulting data structures are numerous. The following scenarios are presented for exemplary purposes and do not limit the scope of the present invention.

5.2.1 Demographic Profile Analysis

Consider a sample of the population for which one wants to analyze profiles of demographics. Consider the following question: Given a person's gender and age, what is the distribution of the other demographic parameters? To analyze this question, one can use the more general form of the distribution of patterns, recording information concerning gender and age. Suppose that the demographic attribute for male is 0 and female is 1. Furthermore, suppose the demographic for age is partitioned into deciles with values of 10, 11, . . . , 19. Each decile represents a range of ages (i.e. 21–30 years old). All the other demographic attributes have key values greater than 20. Suppose one analyzes 4-patterns for which gender and age are present, and uses the bijection for 2-patterns to encode the gender and age decile into the information portion of the 4-patterns. One can then use the encoding of the gender-age 2-patterns to get the number of occurrences for a specific gender and age decile. Since for this example, one is only interested in patterns that contain gender and age, it is only necessary to develop the mappings for and to calculate the portions of 2-patterns and 4-patterns that contribute to the distribution. From the relevant portions of the distribution of patterns, it is possible to calculate the ratios that establish the percentage of people with a certain gender and within certain age deciles that have any two other demographic attributes.

5.2.2 Demand and Profit Analysis

Consider an example dealing with retail transactions. In this example, a record is a collection of entries or attributes that represent a transaction. Suppose an entry of a record contains as an attribute the identifier for a purchased product, together with three auxiliary attributes; the quantity, the purchase price, and whether the purchase was a promotional.

One can now analyze the distribution of patterns or k-patterns, where the information portion of the pattern encodes the total quantity, total revenue, and total number bought from a promotion for each product that contributed to a pattern. If one were to normalize by dividing these numbers by the number of times a respective pattern occurred, then averages of these quantities would result. Keys for the k-patterns of interest permit this data to be accumulated for a large body of retail transactions. This analysis helps to establish the value of a pattern, or the value of having products represented by a pattern of having been purchased together. Such analysis and other similar analysis offer much insight into the managing of supply chains and the marketing of products in general. In the case of supply chains, using the data structures by k-pattern, one can develop models for demand. As an example, which brands of cereals and at what price and quantity should a supermarket stock if milk is put on sale? If the data analysis configuration provides filtering records or patterns by store locations, it may be observed how the answer depends on location.

5.2.3 Competitive Interaction Analysis

In retail, among other situations, it is important to understand how products or items compete with one another. In such settings, attributes about each product are being collected. For instance, price, discount, store, etc. may have been collected. Data may be collected to provide records on a transaction, daily, or weekly level, etc.

What's important is that these parameters induce a measure of competitive interaction among the products, giving the reasons why products interact competitively. By analyzing the relative frequencies of how these parameters relate to sales, a measure of competitive interaction between products may be determined. Furthermore, such relative frequencies may be computed by modeling the problem in terms of a distribution of patterns within the above-described records.

Once having the relative frequencies for selected k-patterns, it is possible to determine the degree to which certain parameters influenced certain interactions. In other words, how do the parameters within the k-patterns of interest concentrate on the interactions to determine the major contributions to competitive interactions?

Determining how parameters induce measures of interactions between "items" is not restricted to retail. Consider the field of epidemiology. In addition to people exhibiting symptoms and diseases, they are also exposed to a variety of agent and pollutants. If a person's health record includes all those attributes, a k-pattern analysis can reveal associations of interest within such a collection of records. The methodology of the present invention facilitates analysis of k-patterns where k is a relatively large number, permitting analysis of many symptom-disease-agent-pollutant combinations. Discovering how strong an agent's or pollutant's association is to symptoms may be of general interest. Furthermore, one may wish to understand whether agents and pollutants are associated and establish a connection/interaction between symptoms-diseases.

5.2.4 Stock Analysis

Consider an example about tracking relationships between stocks. The following scheme and its generalization are not limited to applications of financial analysis but are also applicable to the general study of time-series data records. The formalism for a more general setting becomes more unreadable as more complicated instruments are considered. As such, consider this basic example.

Stock history is recorded for each day that a stock is traded. It is common that such historical records include:

Stock Index:
  This reference is for identifying the stock. For our purposes this will be a non-negative integer.
Opening Price:
  For the respective day, this indicates the price of the stock when the market opened.
Daily High:
  For the respective day, this indicates the highest trading price of the stock.
Daily Low:
  For the respective day, this indicates the lowest trading price of the stock.
Closing Price:
  For the respective day, this indicates the price of the stock when the market closed.
Volume:
  For the respective day, this indicates the number of shares traded of the stock.

When comparing stocks it is often useful to consider relative changes. For the purposes of this discussion, consider the following attributes collected in records:

Stock Index—"$s(0)$":
  This reference is for identifying the stock. For our purposes this will be a non-negative integer.
Opening Price—"$s(1)$":
  For the respective day, this indicates the price of the stock when the market opened.
Percentage High—"$s(2)$":
  For the respective day, this indicates the percentage gain of this stocks highest price from its opening price.
Percentage Low—"$s(3)$":
  For the respective day, this indicates the percentage loss of this stocks lowest price from its opening price.
Closing Price—"$s(4)$":
  For the respective day, this indicates the price of the stock when the market closed.
Volume—"$s(5)$":
  For the respective day, this indicates the number of shares traded of the stock.

If an arbitrary stock is denoted by $s_j$, then its daily entry might be represented as:

$$s_j = \{s_j(0), s_j(1), s_j(2), s_j(3), s_j(4), s_j(5)\}.$$

A record for the market might comprise a daily entry for each stock traded that day, denoted by $$\bar{r} = s_1 s_2 \ldots s_t,$$

The collection of all such records for the period of time one wishes to analyze will be denoted by M.

For exemplary purpose only, suppose that one wants to analyze how well the "percentage high" for pairs of stocks track each other per day. On a given day, the difference between percentage high for stocks $s_i$ and $s_j$ is given by $|s_i(2)-s_j(2)|$. The indices $s_i(0)$ and $s_j(0)$ may be tracked as an pattern. Assume that $s_i(0)<s_j(0)$ and let P denote the pattern for this pair of stocks. The average difference between percentage high for P can be found by summing over the occurrences of the pattern and dividing by the number of occurrences, which is given by $$(1/\#P) \sum_{r \in M} \sum_{\{p|p \leq r\}} |s_i(2) - s_j(2)| 1_P(\bar{p}).$$

Where $s_i(2)$ and $s_j(2)$ take values from $\bar{p}$. Higher order statistics, and different functions between the attributes and auxiliary attributes may be considered in order to stress different aspect about the patterns in question.

In addition, one may consider higher order patterns. For example, if P represents a triple of indices {i, j, k} with i<j<k, then the following gives the average difference between percentage highs for the pairing of indices that contributed to P.

$$(1/\#P) \sum_{r \in M} \sum_{\{p|p \leq r\}} |s_i(2) - s_j(2)| 1_P(\bar{p})$$

$$(1/\#P) \sum_{r \in M} \sum_{\{p|p \leq r\}} |s_i(2) - s_k(2)| 1_P(\bar{p})$$

$$(1/\#P) \sum_{r \in M} \sum_{\{p|p \leq r\}} |s_j(2) - s_k(2)| 1_P(\bar{p})$$

The formulas for these statistics are more complicated to formalize than they are to evaluate in practice. As the data processing system parses the records in a data source, it generates patterns (and corresponding keys) and calculates incremental changes to the statistics that are tracked as part of the information portion of the distribution of patterns. The definition of the mapping used to provide a key for each patterns of interest allows the information developed for each pattern to be tracked. After this step the system may normalize this "information" to produce relevant statistics from which to base decisions.

Note that it is possible to have analyzed the percentage low, the gap between high and low, etc. In addition, although not formalized here, it is possible to analyze patterns across multiple days by considering several days of transactions as a single record. In this fashion, the system may construct the "records" from the daily transactions as the data source is being read. K-patterns may then be selected for analysis and corresponding keys defined for those constructed "records."

In addition to developing the absolute value of the difference as done in this example, one can consider root mean square differences as in section 5.1.4. Higher-order statistics involving three or more time-series and high-order moments may also be developed.

5.2.5 Real-Time Pattern Detection and Response

The preceding discussion makes clear that the present invention makes possible the efficient generation of data structures in which large amounts of information on specific defined associational relationships (distribution patterns for k-patterns) of interest can be stored. While human study of these results to inform human decisions is the usual goal, the distribution pattern results produced may also be analyzed by machine intelligence. This is particularly useful where the analysis of the results requires many k-patterns and the associated distribution pattern information as stored in the data structures to be analyzed. In such cases, comparisons between highly disparate parts or many different parts of the results or rapid finding of a particular type of k-pattern results may be difficult or impossible for an unaided human Further analysis of the results by other software agents may be required.

In all of these instances, the key to k-pattern mapping relationships taught by the present invention provide efficient access to desired pieces of information; that is, any "row" in a data structure as in FIGS. 4 and 5 is readily found. However, the data structures also permit the insertion of certain pattern detection criteria that can be used by software that analyzes the k-pattern information as it is developed or when various stages of completion are reached.

For exemplary purposes, suppose an organization analyzes transactional data records for behavioral patterns and wants to trigger an immediate response when an event occurs. The trigger might cause a signal to notify police, FBI, etc. indicating detainment of a person or persons that caused the pattern that triggers the signal. A similar response system may be useful for medical response, both in extreme medical situations and in more controlled situations for diagnostics. Triggers associated with the occurrence or frequency of occurrence of particular patterns of medical data may alert doctors to symptoms to look for and actions to take. Analogously, the system might track a retail purchase transaction in real time and, based on previous k-pattern data from this retail environment recommend in real time that one try to sell additional products as in a "call center" or e-commerce situation.

The virtual key data structure that encodes the k-patterns has associated counters being incremented as records are processed to keep track of the number of occurrences of a pattern. The information portion of the data structure "row" for any k-pattern may additionally have pattern detection "trigger" data inserted that indicate when a response is to be triggered and even indicate the type of response(s). One skilled in the art will understand that while updating the counters a return code for successfully updating the counter is returned to the parsing/filtering module of the system. Providing additional software for reading the current state of the information, checking for a trigger and returning a response for the successful execution of updating the counter does not add much additional processing overhead. Thus, the data structure permits easy development of a model that in predefined circumstances provides detection signals to humans or other machines.

For instance, consider the pattern (male, age 25–30, geographic location, car type), the information portion of such a pattern may indicate to police the top ten things an officer might look for when that pattern is encountered and what responsive action to take, or possibly a "flag" has been placed on the pattern to detain any individual matching the pattern. Because the model stored in the information portion of any k-pattern "row" may be regularly updated, a pattern may trigger different responses at different times. As a further instance, such a system could be used to analyze attributes of an individual applying for insurance. A real time pattern analysis of the potential insured's attribute record could trigger recommendations to an insurance agent to ask certain questions that may further help evaluate qualifications for an insurance policy.

Depending on the response times required, the information portion of the k-pattern data may be updated in part or whole at the time the patterns are detected. The remaining portion of the information may be updated as part of additional processing. In this manner, a data structure model for a particular data source is both updated and used to detect and trigger from actionable events in real-time. We stress that complete update of the information portion does not need to occur with each occurrence of a pattern. One possibility is that the counters are incremented at the time an occurrence is found in a record and the portion of the information representing the triggers is updated once a day or upon some administrative command to perform a model update.

Another use of such a system might be for a financial application. The model is updated while markets are open to reflect immediate modeling needs, but processing of more complex contributions to the model (more complex k-patterns or cross-pattern meta-information) is performed as the day evolves or after markets close. The next day the system has a "fresh" model. In yet other cases, the "markets" never close: the analysis and model updating may need to be distributed among several machines in order to handle the work load in real time.

One of the benefits of using the virtual key space for k-patterns is that model generation is easily distributed among several computers. Similarly, the trigger and response portion of the system is also easily distributed.

Furthermore, one skilled in the art will understand that for application purposes, a portion of the pattern information may be used for a real-time system. For example, the level-1 patterns may be augmented with triggers, because updating and evaluating 1-patterns are extremely fast. A secondary response may be triggered from 2-patterns, etc. The results of which may further enhance the decision making of the response instigated from the level-1 patterns. Other k-level patterns may be evaluated accordingly with system performance requirements.

As an example of combining the analytical portion of the current invention with the control/trigger mechanism of the current invention, consider the following situation for medical response. Suppose that patient symptoms are being recorded and analyzed for associations between frequencies of occurrence. FIG. 6 depicts exemplary portions of a k-pattern data structure tracking in a set of records the frequency of patterns of 4 or less symptoms from 1000 possible symptoms. For this example consider, 5 symptoms numbered, after suitable translation, 5, 109, 534, 851, and 905.

Symptom 3-pattern (5, 109, 534) has key value 25742876 and is shown to occur 50 times in the analysis. Symptom 4 pattern (5, 109, 534, 851) has key value 21865720801 and is shown to occur 48 times, while symptom 4-pattern (5, 109, 534, 905) has key value 27931819531 and is shown to occur 45 times. As part of the analysis, the system augments the information portion of the table with the most likely symptoms to be associated with symptom patterns. For instance, pattern (5, 109, 534) is augmented with ((851, 0.96), (905, 0.90), . . . ). This indicates that symptom 851 is the most likely symptom to be found in addition to the symptoms comprising the pattern (5, 109, 534), followed by symptom 905, etc. and the respective ratios for the probabilities are included. This is meta information stored in fields associated with key value 25742876 but derived from distribution pattern information developed for the k-patterns associated with key value 21865720801 and key value 27931819531. FIG. 6 also depicts that trigger information and response type information (see examples above and below) may be stored in separate field, as values or expressions T and R, respectively.

A possible real-time component to this system performs as follows. A patient is being treated and symptoms are noticed by the examiner and entered into an input device from which the system returns the most likely additional symptoms to be associated with these symptoms. The system translates the symptoms to internal pattern references (5, 109, 534) and subsequently looks up most likely symptoms to be associated with the input and returns a list which may be suitably translated back to real world symptoms that the examiner may act upon. The examiner may subsequently check and find additional symptoms which adjust the current pattern. The system may return further associations, etc. When the examination is completed, the system completes an incremental update of the table, per the final symptoms found by the examiner. Note that the system can perform such a response and update with no knowledge of the patient's identity.

As noted above, in some situations where rapid action not possible by a human is required, the response triggered by k-pattern results may be signaled to a machine and not to a human, for example, a monitoring device could track a number of biophysical attributes of a patient in intensive care. Upon the recognition of certain patterns, an audible alarm can be provided and a detection signal, which may include a control signal, can be provided to a controlled device (see FIG. 1, at 228), such as a pump or other therapeutic device to deliver indicated medication.

In sum, the k-pattern data structures as defined herein facilitate real time pattern detection and issuing of signals for response in at least two ways: (1) by permitting the insertion of "trigger" information in association with a k-pattern, so that software that is accessing data associated with a particular key can not only perform the update but check the data against a trigger; and (2) by permitting the data structure to store response type information (or a pointer to it), in association with a k-pattern so that a signal reporting that a trigger event has occurred can also have associated response information that is selected for that trigger.

It should be noted that the "trigger" information on the response type information may be of at least two kinds. First, it may be external information formulated without particular reference to the k-pattern data that is developed as a set of records is processed. For example, a particular pattern may indicate identity fraud warranting a law enforcement response when a given occurrence level is reached. This "trigger" level is determined by an external judgment. Second, it may be "meta-information" that is derived from k-patterns other than the k-pattern where the "trigger" information or response type information is stored. For example, a particular pattern may indicate an acute epidemiological situation, but that pattern may only be identified when related subset k-patterns that are also being analyzed for the same record set rise to a certain level of occurrence and have a high degree of correlation. This meta-information is developed and inserted for one k-pattern only as the other subset k-patterns are analyzed.

5.3 Overview of Scalability Issues

As mentioned, data analysis in the form of determining patterns is relevant to computerized data in a variety of different fields where records may contain associational data of interest. The purpose for determining associational patterns in data is usually to make a statement about what the data represents in order make informed decisions. For exemplary purposes only consider the statements:

1. Deciding to buy one stock and sell another stock.
2. Females are X percent more likely than males to vote a certain way.
3. Correlating changes in the demand of purchased products over time to the demographics profiles of the purchasers.

The more complete an analysis that can be performed about the data patterns, the more likely one is to make a correct decision based on the data. Many questions can be answered by determining the number of occurrences of patterns, together with some basic statistics about the patterns. The present invention provides analysis methods that yield pattern data for making a better informed decision based upon the patterns analyzed. When the amount of data becomes increasingly large, issues of scalability in processing data become more important. Scalability issues can take several forms. Improvements in any of the following three areas can help to address the scalability of pattern analysis:

System Performance

Increasing system processing speed is required in order to analyze more complex pattern structures. This occurs year to year in the technology, but it is usually an expensive way to improve data processing resources requiring investments in new hardware or more efficient software.

Distributing Calculation

Distributing the workload across multiple machines in order to reduce the time frame of calculation may be required. Furthermore, results from an analysis may require a distributed representation, because the results may not fit on a single machine.

Sequential Calculation

Related to the previous two issues is the benefit from performing a partitionable sequential calculation. One of the largest benefits comes in the form minimizing communications between machines, if each computing node in a distributed calculation can start at different points in the data set or the calculation can be performed in pieces and stored to external storage and combined or aggregated upon completion.

Related to the issue of scalability is the complexity of patterns for which analysis is obtainable. The more complex the class of patterns being considered, the more scalability becomes a factor. The existence of enormous data sets and the need for more complicated pattern analysis need to be balanced against each other.

The present invention facilitates building software that can deliver improvements in all these areas, particularly the second and third.

5.4 Embodiments of the Invention 5.4.1 First Embodiment of Invention

In section 3, a summary of the processing steps entailed in the present invention were presented. In this section, we first review the steps presented earlier and then present a more complete description of these embodiments.

In the embodiment of the invention illustrated in FIG. 2, a method for processing records from a data source and for determining a general form of the distribution of patterns or a subset within such records entails:

1. Providing input data in the form of records.
2. Filtering the input in accordance with an analysis configuration to prepare attributes and k-patterns for mapping by a bijection (or other invertible mapping) and to select only those records relevant to analysis.
3. Defining a mapping for the k-patterns to be analyzed into a co-domain of keys using the bijection.
4. Calculating information pertaining to the patterns found within the processed records, using the keys defined for tracking information for selected k-patterns, with possible additional filtering in accordance with the configuration.
5. if required:
   a. Externally storing (i.e., by moving from main memory to secondary storage) interim information pertaining to the occurring patterns.
   b. Combining of interim information pertaining to the occurring patterns.
   c. Additional filtering of the processed patterns.
6. Inverting the mapping to return the attribute patterns to their original domain.
7. Providing a summary of the information pertaining to the patterns in accordance with criteria stated within the analysis configuration.

In this, the first embodiment of the present invention, there exist objects and processes. An object is a complex data structure. Examples of objects are, but not limited to, files and records found in data streams on a computer system or a physically addressable (or accessible) portion of a computer system's memory. Such memory objects include, but are not limited to:

1. The internal memory of a computer, in the form of Ready Access Memory (RAM).
2. The external or secondary memory of a computer, in the form of storage on possible a plurality of storage devices, such as hard drives.

The phrases internal and external are somewhat arbitrary and refer to componentry of a computer and not to the system that embodies the present invention. Both internal and external memory objects are included in the system in any of the embodiments of the present invention.

FIG. 2 illustrates the first embodiment's use of the following objects:

1. Input Data—Any embodiment of this invention processes data in form of input. In practice input can take many forms. For instance:
   a. Input in the form of files of records.
   b. Input in the form of access to records from a distinct system such as, but limited to, a database or plurality of databases.
   c. Input in the form of access to records from within the system, such as memory objects.

The system makes no assumption about the ordering of attributes in the real world records. The internal record is developed from the real world record(s) as part of Filter (A) discussed later.

2. Configuration—The configuration component of this invention has an object that includes a representation for the processing steps the system will undertake. For example:
   a. Determines which portions of the general form of the distribution of patterns are to be calculated.
   b. Whether filtering is to be performed on records (e.g., to select only certain records deemed relevant to the analysis) and at what stages and order of processing such filtering is to occur.

3. Internal Storage—Stores objects that the system establishes and maintains in order to process and maintain the distribution of patterns, or some subset of the distribution of patterns as prescribed by the configuration.
4. External Storage—Stores objects that the system establishes and maintains in order to process and maintain the distribution of patterns, or some subset of the distribution of patterns as prescribed by the configuration. Conceptually, external storage is an extension of internal storage, because of the qualities of the present invention permitting partitioning and recombining of portions of the computations.
5. Auxiliary Data/Information—Represents the objects that the system establishes and maintains in order to process and enhance the distribution of patterns as prescribed by the configuration.

The active processing steps in one embodiment as illustrated in FIG. 2 as follows:

1. Filter—Filtering is a process whereby a data stream is altered. The system, as prescribed by the configuration, performs filtering in the form of pruning, generating patterns, and augmenting of the data stream with auxiliary data/information. Although, it is possible to filter at any portion of processing, there are three distinct portions of the processing which need to be discussed.
    (A)—The filtering at this stage generates unmapped patterns (i.e., no keys yet assigned) from the records in the input as prescribed by the configuration and prepares the data stream for the next processing stage of "mapping." Such preparation might include, but is not limited to, only considering unmapped patterns that met some condition. Furthermore, in the above mathematical description of the attribute pattern mapping to be performed in the system, records are assumed to be in a particular format. In practice, real data may not be presented in the format that the system processing requires. Part of this filtering step is to prepare the input to be further processed for mapping by the system.
    (C)—This filtering stage uses the output from the mapping stage, together with any auxiliary data/information, to create an internal storage representation of the distribution of patterns as prescribed by the configuration.
    (F)—This filtering stage may further alter the distribution of patterns. For example, the configuration may prescribe that the system only include in results patterns that occurred more than certain number of times. In addition, this may further depend on k (i.e. a threshold for pruning that depends on the number of elements in any k-pattern).
2. Mapping (B)—Mapping is one of this system's basic processing stages, whereby binomial number systems or other invertible mappings are used to define keys for a virtual space that can represent all patterns of interest and store key-labeled information about the patterns that actually appear in the data.
3. Conditional Processing (2a)—Depending on the configuration of the system, filtering stage (C) and objects included in Auxiliary Data/Information may be required.
4. Conditional Processing (2b)—Depending on the capacity of the internal memory of the system, external memory may be needed to receive a partial result and then return it for combination with other partial results to complete a stage of computation. In cases when this is required, the following processing steps are performed:
    Write (D)—This is the process of storing a representation of the internal storage for the partial result, i.e., a calculated portion of the distribution of patterns, to external or secondary storage and making internal storage available for further processing.
    Combine (E)—The process of writing may produce a plurality of external partial result storage objects that may be combined to form a single storage object as prescribed by the configuration. Furthermore, the storage object may be an internal or external storage object.
5. Invert Mapping (G)—The representation of the distribution of patterns that uses the mapped values may be incomprehensible to humans as to which pattern is represented by its corresponding key. The invert mapping stage is the process of producing a storage object that is a useful k-pattern distribution report prescribed by the configuration. This may entail using the reversible quality of the bijection or other invertible mapping to represent the results in a human comprehensible form. It may also entail representing the results in a form (graph or other visualization tool) that aids or enables further processing or understanding.

In one form, the report is derived from a table such as in FIGS. 4, 5 or 6, where the attributes corresponding to k-patterns are included in the report (with or without the corresponding keys) and the distribution pattern data is printed and labeled according to the particular functions used to compute it. In another form, the report is prepared by using a filter to look at particular k-patterns, for example by selecting according to cardinality or one of the other distribution patterns, and providing the information as in the first form only for that selection. In a further form of report, the information is converted into graphical format with selected sets of –k-patterns appearing on the same graph for comparison. In a still further form, the report may be a hierarchical computer file with navigational aids to permit a report user to select data by k-pattern level and starting at one k-pattern to display related lower or higher k-patterns. All such reports are facilitated by the keyed data structures resulting from use of the invention.

5.4.2 Alternative Embodiment of Invention

An alternative embodiment of the present invention entails uses a plurality of instances of the invention to distribute the calculation and, as needed, the key definition for k-patterns across a plurality of computing machines, called nodes, which process "in parallel." (See FIG. 1, where machines 200, 220 may be separate nodes). A collection of computing nodes forms a computing cluster. Note that binomial number system representations used to define k-pattern keys often do not depend on the maximum size of the attributes keys. In such cases, distributing the calculation of a distribution of patterns across a plurality of computing nodes is aided, because each node computes autonomously, while remaining synchronized with the calculations of any other node. Since in many practical cases, the general form of the distribution of patterns involves information that is additive, the general form may usually be distributed across a computing cluster in a manner analogous to the combining of partial result calculations of the distribution that were stored in external objects.

Furthermore, each node can start computing at different portions of the data source, because the calculation will have one or more stages that are sequential. Analogous to combining of external storage objects in the first embodiment, by using common key definitions this alternative embodiment can perform a complete recombination of partial calculations from among the cluster nodes to present a unified representation for the distribution of patterns.

Alternatively, such a representation may exceed the memory available to a storage object and a distributed representation of the distribution pattern information might be needed.

5.4.3 Further Alternative Embodiment of Invention

The third embodiment of the present invention entails using a plurality of instances of the first alternative embodiment of the invention to process serially. Since the output from one instance of the system can be used as input and auxiliary data for another instance, the patterns generated by one instance of the system can be communicated to and used in the processing of a later instance.

A special case of the embodiment is when the first alternative embodiment is one instance of the first embodiment described. In this case, the second alternative embodiment is based on a plurality of instances of the first embodiment of the invention used to process serially.

Whether the special case or the general case of the third embodiment, consider that it is possible that one only wants to consider k-patterns from attributes that contributed significantly to (k–1)-patterns. The $k^{th}$ instance of the system computes k-patterns, while making use of the information from the previous instances of the system that computed less complicated patterns. This type of condition is common in data mining applications, such as association rule mining or sequential pattern discovery. It is a feed forward method of using meta-information, with one level used to provide information to a higher level.

5.4.4 Flowchart

Figure 3:
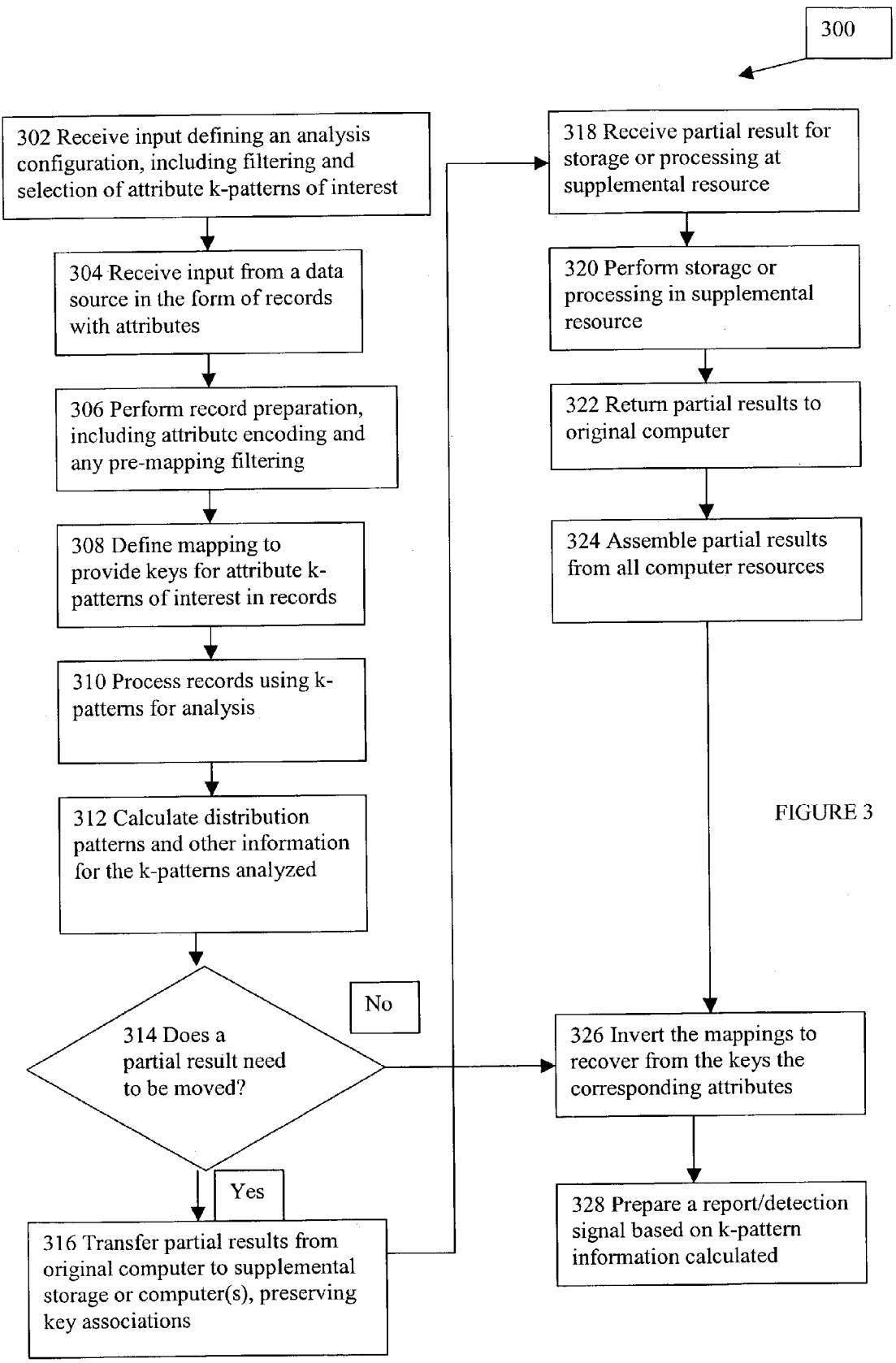
FIG. 3 shows a flowchart of the overall process of the present invention.

FIG. 3 shows in flowchart form the steps of the general method 300 of processing records and developing k-pattern distribution information used in the various embodiments described above.

At step 302, in preparation for analysis of records from a data source, the system receives input defining the analysis configuration. This includes rules on filtering data and selection of attribute k-patterns of interest. At step 304, the system receives input from a data source in the form of records with attributes. At step 306, the system performs record preparation, including coding attributes in a form acceptable for the domain of a mapping algorithm and performing any pre-mapping filtering. At step 308, the system defines the mapping to be used to provide keys for attribute k-patterns of interest that will be analyzed. This mapping defines a virtual space with a co-domain of keys as exemplified in FIGS. 4 and/or 5. At step 310, the system processes records using the k patterns as a focus for analysis. At step 312 calculations are performed to determine distributions patterns and other information for the k-patterns analyzed. This information is stored with an association to its corresponding attribute pattern key.

At step 314 a determination is made whether a partial result needs to be moved to another memory resource or other, supplemental computing resource. If not, the system can proceed to the final steps 326 and 328 discussed below. If partial results need to be moved, for example due to a memory limitation, this is a partitioning of the calculation. At step 316 the calculation is partitioned by transferring the partial results from the original computer to a supplemental resource, such as additional storage or additional data processing resources. The attribute pattern key associations that are part of the partial result are preserved for later combining with other partial results. At 318 and 320, the partial results are received and stored at the supplemental computer resource(s). At 322, the partial results are returned to the original computer and at 324 the partial results from all computer resources used are assembled, per the additive qualities of the data structures and algorithms used.

At step 326, the mappings are inverted to recover from the keys, the corresponding attributes and k-patterns. At 328, the system prepares a report and/or issues a control signal (or, more generally a detection signal, including both control and non-control information elements), based on the k-pattern information that has been calculated.

5.5 Benefits Over Prior Art

Many systems for analyzing patterns in data make assumptions about the problems that may be analyzed. Some assumptions are more realistic than others. For instance, assumptions that are concerned with the physical and electronic limitations of computers are difficult to avoid. Other assumptions may be avoided, or minimized. Although not a complete list, the embodiments of the current invention attempt to avoid analysis-limiting assumptions and to maximize the following, thereby providing benefits.

1. Increasing the possible configurations of the system to enable tailoring of the system to specific record types and data analysis problems.
2. Increasing the ease of distributing the calculation across a cluster of computing machines. Parallelizing a calculation can at times be extremely hard. The use of common keys defined by shared binomial number systems (or other invertible mappings) to represent k-patterns enables synchronization among all nodes of a computing cluster. The nodes communicate only for distributing the data among the nodes of a cluster and combining the calculations made at separate nodes.
3. Parallelization of the calculation is inherent in the approach and aided by the k-pattern keys defined by binomial number systems. As such, these teachings are equally beneficial in computing cluster environments, as well as multiple processor environments like SMP.
4. Increasing the maintainability of the system by use of binomial number systems to define k-pattern keys. Reducing to practice and maintainability of software can at times be hard to achieve. Combinatorial representations such as using binomial number systems to define k-pattern keys permit object-oriented programming to deal with discrete portions of the analysis software and can simplify software development and maintenance.
5. Increasing the types of analyses performed. The current invention has an increased ability to analyze statistics of patterns.

I claim:

1. A computer-implemented method for analyzing a data source to find association relationships between attributes recorded in the data source, comprising:
    (a) receiving two or more data records, each record containing one or more of attributes of interest;
    (b) defining at least two attribute k-patterns by reference to a subset of the attributes, where k is an integer and represents the number of attributes that are included in a k-pattern and k is assigned at least two non-zero integer values;
    (c) using an invertible, mathematically closed-form mapping algorithm, in the form of:

$$S + \sum_{\alpha=1}^{k} \binom{w_\alpha}{\alpha}.$$

where:
S is any number used as an offset, including 0;
k is an integer >0;
α is an integer index of summation >0 and less than or equal to k;
$w_\alpha$ are integer representations of records or items within the data source, mapping each of the at least two attribute k-patterns into an associated unique key;
(d) determining a distribution pattern for each of the at least two attribute k-patterns defined in step (b);
(e) inverting the mapping to decode from the keys to the associated attribute k-pattern; and
(f) using the keys, associating the distribution patterns determined with each of the at least two attribute k-patterns.

2. The method of claim 1 wherein the step of using an invertible, mathematically closed-form mapping further comprises setting S as:

$$\sum_{i:i<k} \binom{N}{i}$$

to produce the following mapping:

$$\sum_{i:\ i<k} \binom{N}{i}.$$

where:
N is an integer representing the total number of attributes within the data source;
i is an integer index of summation >0 and less than k;
k is an integer >1.

3. The method of claim 1 wherein the step of using an invertible, mathematically closed-form mapping further comprises setting S equal to zero, substituting $N-w_\alpha$ for $w_\alpha$, substituting (k−α+1) for α, and re-ordering the summation to produce the following mapping:

$$\sum_{\alpha=1}^{k} \binom{N-w_\alpha}{k-\alpha+1}.$$

where:
N is an integer representing the total number of attributes within the data source;
k is an integer >1.

4. The method of claim 1 wherein the step of using an invertible, mathematically closed-form mapping further comprises setting S to be (−N), substituting $N-w_\alpha$ for $w_\alpha$, substituting (k−α+1) for α, re-ordering the summation to and multiplying the expression by (−1) to produce the following mapping:

$$N - \sum_{\alpha=1}^{k} \binom{N-w_\alpha}{k-\alpha+1}.$$

where:
N is an integer representing the total number of attributes within the data source;
k is an integer >1.

5. The method of claim 1 wherein the step of using an invertible, mathematically closed-form mapping further comprises setting S equal to zero, substituting $w_\alpha-1$ for $w_\alpha$, substituting (k−α+1) for α, and re-ordering the summation to produce the following mapping:

$$\sum_{\alpha=1}^{k} \binom{w_\alpha \ -1}{k- \ \alpha+1}.$$

where:
k is an integer >1.

6. The method of claim 1 wherein the step of using an invertible, mathematically closed-form mapping comprises setting S equal to zero, substituting $w_\alpha+\alpha-1$ for $w_\alpha$, and re-ordering the summation to produce the following mapping:

$$\sum_{\alpha=1}^{k} \binom{w_\alpha + \alpha - 1}{\alpha}$$

where:
k is an integer >1;
α is an integer index of summation >1 and less than or equal to k.

7. The method of claim 1 wherein the step of using an invertible, mathematically closed-form mapping further comprises setting S equal to zero, and reducing fraction terms to produce the following mapping:

$$\sum_{\alpha=1}^{k}$$

where $$P(m:\ n) = \prod_{j=1}^{n}(m-n+j), \quad P(m:\ 0) = 1.$$

and where:
k is an integer >1;
m and n are integer variables with m>n>1;
j is an integer index or product >0 and less than or equal to n.

8. The method of claim 1 wherein the step of using an invertible, mathematically closed-form mapping further comprises setting S equal to:

$$\sum_{i:i<k} \binom{N}{i}$$

and reducing fraction terms to produce the following mapping:

$$\sum_{\alpha=1}^{k}$$

where $$P(m:n) = \prod_{j=1}^{n}(m-n+j), \quad P(m:0) = 1.$$

and where:

N is an integer representing the total number or attributes within the data source;

k is an integer >1;

m and n are integer variables with m>n>1;

j is an integer index of product >0 and less than or equal to n.

9. The method of claim 1 wherein the step of determining a distribution pattern comprises determining the frequency of appearance of each of the at least two attribute k-patterns defined in step (b).

10. The method of claim 1 wherein the step of determining a distribution pattern comprises determining a direct sum over each of the at least two k-patterns, where k>1.

11. The method of claim 1 further comprising the step of applying a filter either before the mapping or after the mapping to select records for analysis or to select for analysis a subset of k-patterns that can be generated from the records with a combinatorial expansion.

12. The method of claim 1 wherein k is an integer greater than or equal to 2.

13. The method of claim 1 wherein the step of determining a distribution pattern comprises computing a root mean square difference between any two attributes of a k-pattern.

14. The method of claim 1 wherein the step of determining a distribution pattern comprises computing for a selected k-pattern information using a function that is additive from record to record.

15. The method of claim 1 further comprising the step of:
(g) providing a k-pattern distribution report using determined distribution patterns and the attributes corresponding to the k-patterns covered by the report.

16. The method of claim 1 further comprising the step of:
(g) storing in association with at least one attribute k-pattern detection trigger information; and
(h) responsive to analysis of the trigger information and distribution pattern information for the at least one-k-pattern, issuing a detection signal.

17. The method of claim 16 wherein the detection signal is directed to a human agent.

18. The method of claim 16 wherein the detection signal is directed to a machine agent.

19. The method of claim 16 wherein the detection signal is directed to a machine agent and is a control signal.

20. The method of claim 1 wherein the step of determining a distribution pattern comprises:

determining whether computations involved in determining a distribution pattern require use of additional memory or other system resources;

responsive to a determination that computations involved in determining a distribution pattern require use of additional memory or other system resources, partitioning the determining of a distribution pattern into partial results associated with a key and providing the partial results to the additional memory or other system resources; and combining partial results associated with a key to provide combined results associated with the key and its associated k-pattern.

21. A program storage device readable by a machine, embodying a program of instructions executable by the machine to perform method steps for analyzing a data source to find association relationships between attributes recorded in the data source, said method steps comprising:

receiving two or more data records, each record containing one or more of attributes of interest;

defining at least two attribute k-patterns by reference to a subset of the attributes, where k is an integer and represents the number of mapped attributes that are included in a k-pattern and k is assigned at least two non-zero integer values;

using an invertible, mathematically closed-form mapping algorithm, in the form of:

$$S + \sum_{\alpha=1}^{k} \binom{w_\alpha}{\alpha}.$$

where:

S is any number used as an offset, including 0;

k is an integer >0;

$\alpha$ is an integer index of summation >0 and less than or equal to k:

$w_\alpha$ are integer representations of records or items within the data source, mapping each of the at least two attribute k-patterns into an associated unique key; determining a distribution pattern for each of the at least two attribute k-patterns defined in a preceding step;

inverting the mapping to decode from the keys to the corresponding attribute k-pattern; and using the keys, associating the distribution patterns determined with each of the at least two attribute k-patterns.

22. The program storage device of claim 21 wherein the method steps further comprise the step of:

providing a k-pattern distribution report using determined distribution patterns and the attributes corresponding to the k-patterns covered by the report.

23. The program storage device of claim 21 wherein the method step of determining a distribution pattern comprises computing for a selected k-pattern information using a function that is additive from record to record.

24. A computer system for analyzing a data source to find association relationships between attributes recorded in the data, comprising:

at least one processor and accessible memory; and a computer program accessible for execution by the processor, said program containing the following components:

(a) instructions for receiving two or more data records, each record containing one or more of attributes of interest;

(b) instructions for receiving a definition of at least two attribute k-patterns by reference to a subset of the attributes, where k is an integer and represents the number of mapped attributes that are included in the k-pattern and k is assigned at least two non-zero integer values (c) instructions for using an invertible, mathematically closed-form mapping algorithm in the form of:

$$S + \sum_{\alpha=1}^{k} \binom{w_\alpha}{\alpha}.$$

where:
S is any number used as an offset, including 0;
k is an integer>0;
α is an integer index of summation >0 and less than or equal to k;
$w_\alpha$ are integer representations of records or items within the data source,
to map each of the at least two attribute k-patterns into an associated unique key;

(d) instructions for determining a distribution pattern for each of the at least two attribute k-patterns defined in a preceding step;

(e) instructions for inverting the mapping to decode from the keys to the associated attribute k-pattern; and (f) instructions for associating the distribution patterns determined with each of the at least two attribute k-patterns.

25. The computer system of claim 24 wherein the program components further comprise instructions for providing a k-pattern distribution report using determined distribution patterns and the attributes.

26. The computer system of claim 24 wherein the program components further comprise instructions defining an analysis configuration for processing the two or more records, said analysis configuration comprising one or more of the following:

instructions for partitioning the processing of data records to develop partial results for computations that are additive;

instructions defining at least one k-pattern by attributes or auxiliary attributes included in or excluded from the k-pattern and controlling filtering records from the data source to exclude from analysis records that are not part of the k-pattern definition; and instructions defining meta-information that describes an associational relationship between one k-pattern and distribution pattern information developed for at least one other k-pattern.

27. A data structure stored in a computer memory, said data structure developed by the following method:

(a) receiving two or more data records, each record containing one or more of attributes of interest;

(b) defining at least two attribute k-patterns by reference to a subset of the attributes, where k is an integer and represents the number of attributes that are included in a k- pattern;

(c) defining an invertible, mathematically closed-form mapping algorithm in the form of:

$$S + \sum_{\alpha=1}^{k} \binom{w_\alpha}{\alpha}.$$

where:
S is any number used as an offset, including 0;
k is an integer >0;
α is an integer index of summation >0 and less than or equal to k;
$w_\alpha$ are integer representations of records or items within the data source,
for mapping each of the at least two attribute k-patterns into an associated unique key;

(d) analyzing the data records and determining an actual distribution pattern for records containing each of the at least two attribute k-patterns defined in step (b); and (e) storing the actual distribution patterns in accordance with the mapping to permit decoding from the keys to the corresponding attribute k-pattern.

28. A data structure in accordance with claim 27 wherein the data structure is partitioned into partial results that can be combined to produce combined results for an attribute k-pattern.

29. A data structure in accordance with claim 28 wherein the partial results of the data structure are stored in different levels of the memory of one computer system.

30. A data structure in accordance with claim 28 wherein the partial results of the data structure are stored on multiple computer systems.

31. A data structure in accordance with claim 27 wherein the keys are defined by a bijection mapping algorithm that yields an increasing sequence of real numbers.

32. A data structure in accordance with claim 27 wherein the data records received are product purchase transaction records.

33. A data structure in accordance with claim 27 wherein the data records received are product purchase transaction records and the attributes of interest in such records are attributes that may cause competitive interactions.

34. A data structure in accordance with claim 27 wherein the data records received are stock prices for different points in time.

35. A data structure in accordance with claim 27 wherein the data records received are image data records and the attributes of interest are variations among the images.

* * * * *